US006976836B2

(12) United States Patent
Suzuki

(10) Patent No.: US 6,976,836 B2
(45) Date of Patent: Dec. 20, 2005

(54) BIAXIAL STRETCH BLOW MOLDING METHOD AND APPARATUS FOR WIDE-MOUTHED CONTAINERS

(75) Inventor: Saburo Suzuki, Nagano-ken (JP)

(73) Assignee: Frontier Inc., Nagano-ken (JP)

( * ) Notice: Subject to any disclaimer, the term of this patent is extended or adjusted under 35 U.S.C. 154(b) by 310 days.

(21) Appl. No.: 10/384,545

(22) Filed: Mar. 11, 2003

(65) Prior Publication Data

US 2003/0168782 A1 Sep. 11, 2003

Related U.S. Application Data

(63) Continuation of application No. PCT/JP02/07237, filed on Jul. 16, 2002.

(30) Foreign Application Priority Data

Mar. 13, 2002 (JP) .............................. 2002-067938

(51) Int. Cl.$^7$ ........................ B29C 49/06; B29C 49/12; B29C 31/08
(52) U.S. Cl. ...................... 425/526; 425/529; 425/534; 425/537; 425/541; 264/538; 414/788.2; 414/795.6; 414/797.7
(58) Field of Search ................................ 425/526, 529, 425/534, 537, 541; 264/532, 535, 538; 414/794.4, 414/794.5, 788.2, 797.7, 795.6

(56) References Cited

U.S. PATENT DOCUMENTS

| | | | | |
|---|---|---|---|---|
| 3,499,063 A | * | 3/1970 | Ninneman et al. | 425/529 |
| 3,661,489 A | * | 5/1972 | Moore | 425/529 |
| 3,680,763 A | * | 8/1972 | Ludder | 264/535 |
| 3,886,247 A | * | 5/1975 | Edwards | 264/535 |
| 3,990,826 A | * | 11/1976 | Marcus | 425/537 |
| 4,299,549 A | * | 11/1981 | Suzuki et al. | 425/526 |
| 4,330,255 A | * | 5/1982 | Suzuki | 425/529 |
| 4,343,575 A | * | 8/1982 | Kimball | 414/788.2 |
| 4,511,025 A | * | 4/1985 | Nakayama | 198/377.08 |
| 4,731,011 A | * | 3/1988 | Nakamura et al. | 425/529 |
| 4,732,557 A | * | 3/1988 | Aoki | 425/529 |
| 4,790,741 A | * | 12/1988 | Takakusaki et al. | 425/526 |
| 4,961,684 A | * | 10/1990 | Provan et al. | 414/797.7 |
| 5,064,093 A | * | 11/1991 | Davis et al. | 414/797.7 |
| 5,404,227 A | * | 4/1995 | Sumita et al. | 198/476.1 |
| 5,683,729 A | * | 11/1997 | Valles | 425/526 |
| 5,783,232 A | * | 7/1998 | Roos et al. | 425/526 |
| 5,863,571 A | * | 1/1999 | Santais et al. | 425/526 |
| 6,413,034 B1 | * | 7/2002 | Wen-Yung | 425/534 |

FOREIGN PATENT DOCUMENTS

EP 0240037 B1 * 10/1987

(Continued)

Primary Examiner—Robert B. Davis
(74) Attorney, Agent, or Firm—Burns, Doane, Swecker & Mathis, L.L.P.

(57) ABSTRACT

In a biaxial stretch blow molding apparatus (10) for wide-mouthed containers, preforms (6) that are in an inverted state are conveyed on a single plane by preform carriers (40) that go around a carrier circuit (30) in the form of a loop, are heated via a heating station (60), and are then transferred via a transfer station (80) to stretch blow molding mold assemblies (72) that go around a circular looped path (71). The molded wide-mouthed containers (1) are taken out of the stretch blow molding mold assemblies (72) along a conveying path on a same plane and collected by a collection station (90). Wide-mouthed containers can be formed continuously and at high speed, which is less wasteful and more economical than the case where wide-mouthed containers that are formed from films.

14 Claims, 24 Drawing Sheets

FOREIGN PATENT DOCUMENTS

| | | |
|---|---|---|
| JP | 58-50926 U | 4/1983 |
| JP | 02-310021 A | 12/1990 |
| WO | WO 9957018 A1 * 11/1999 | ............ B65C 3/26 |
| WO | WO 0073179 A1 * 12/2000 | ........... B29C 49/42 |

* cited by examiner (b)　　　　(a)

Fig.4
(a)
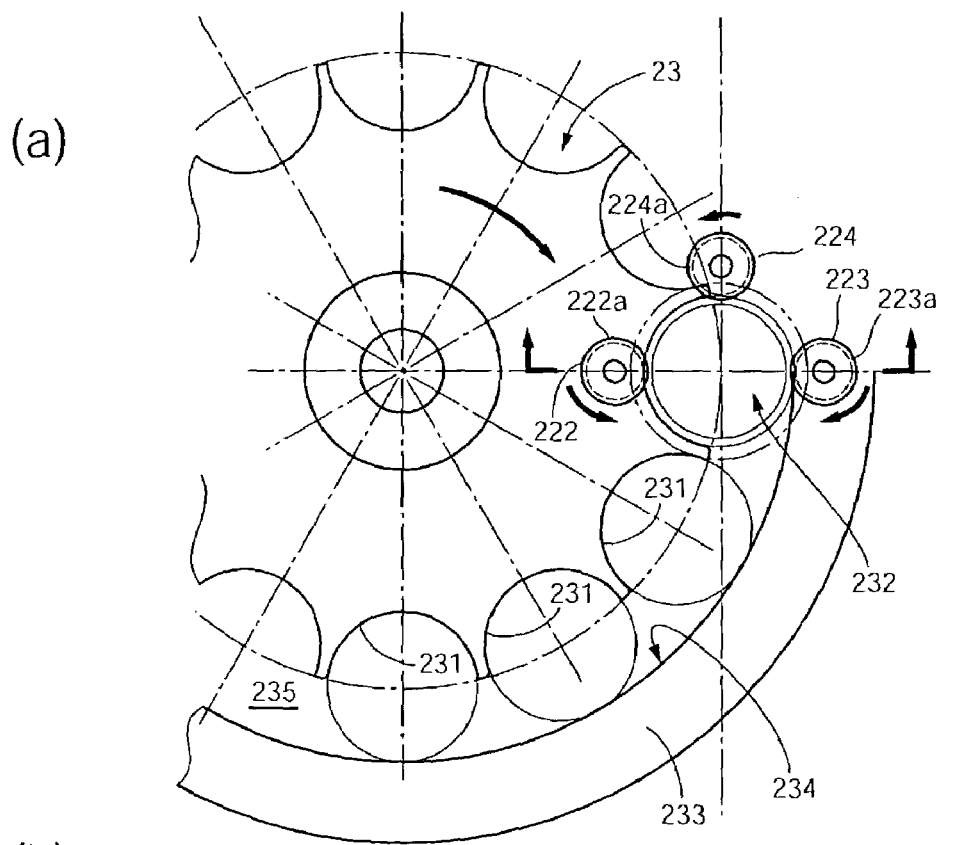
(b)
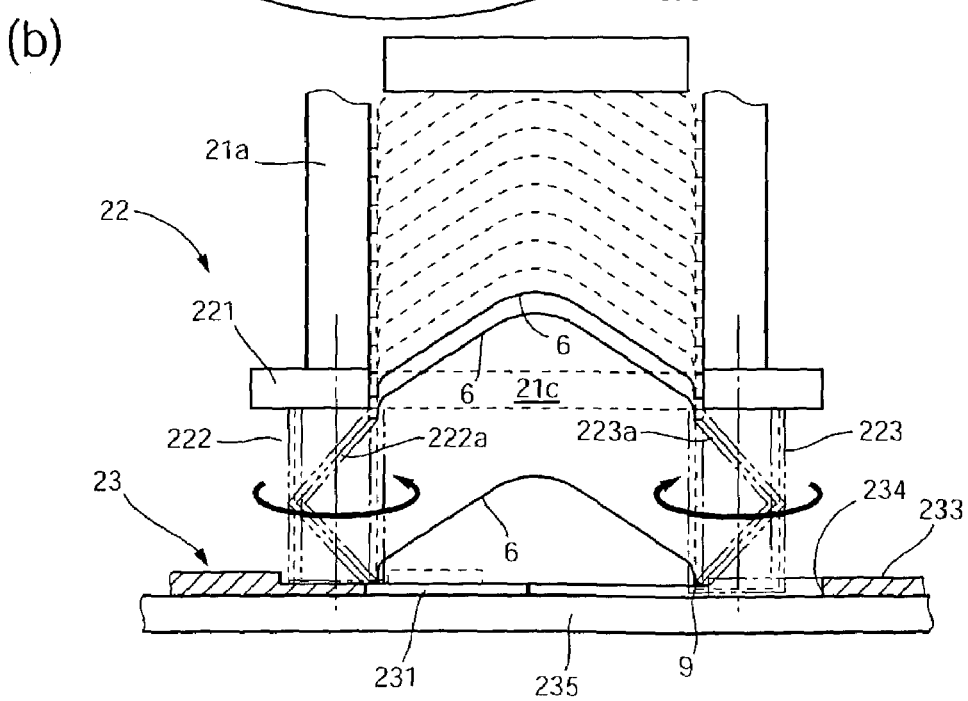

Fig.20
(a)
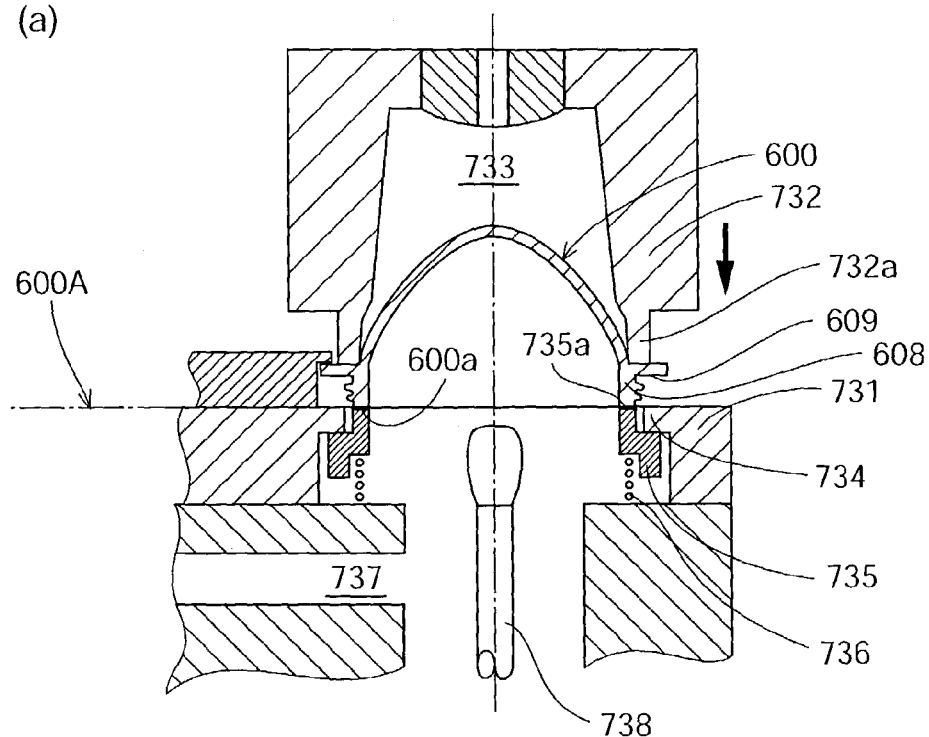
(b)
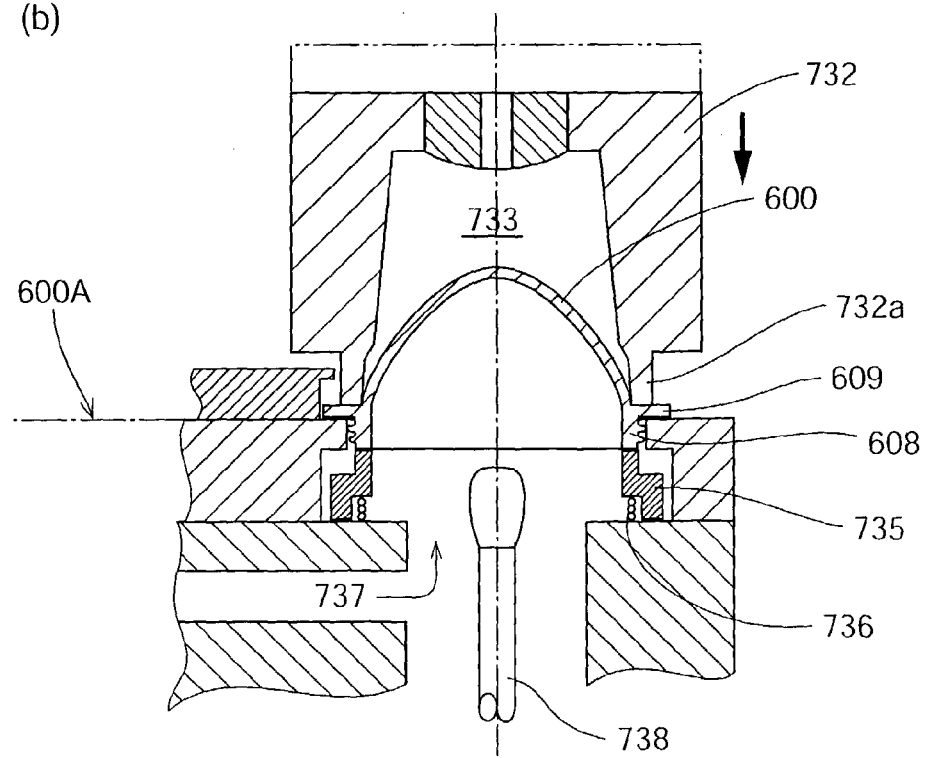

Fig.21
(a)
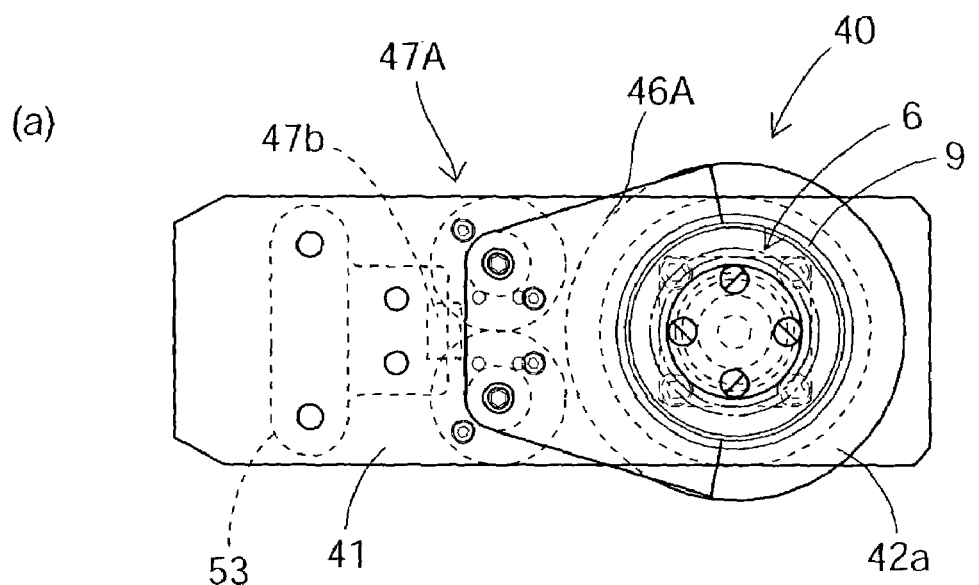
(b)
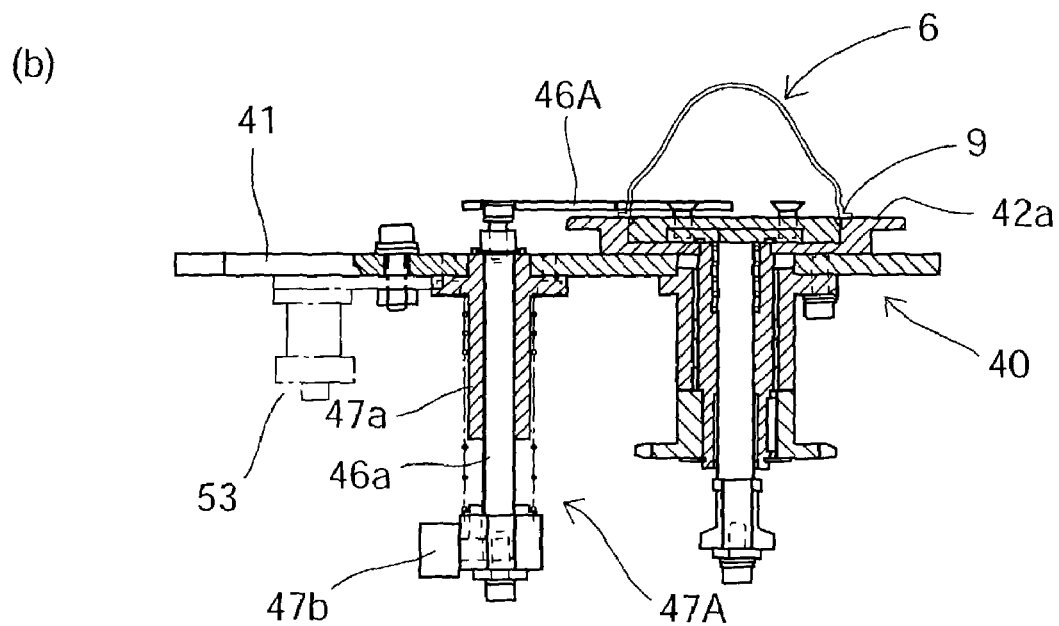

BIAXIAL STRETCH BLOW MOLDING METHOD AND APPARATUS FOR WIDE-MOUTHED CONTAINERS

CROSS-REFERENCE TO RELATED APPLICATIONS

The present application is a continuation of International Application No. PCT/JP02/07237 filed on Jul. 16, 2002, which claims priority of Japanese Patent Application No. JP2001-216523, filed in Japan on Jul. 17, 2001 and Japanese Patent Application No. JP2002-67938, filed in Japan on Mar. 13, 2002, the entire contents of which are hereby incorporated herein by reference.

BACKGROUND OF THE APPLICATION

1. Technical Field

The present invention relates to a biaxial stretch blow molding method and molding apparatus that can mold wide-mouthed containers, which are used as containers for ice cream or milk beverages, consecutively and at high speed.

2. Related Art

The plastic containers used for ice cream and milk beverages are usually formed in the shape of a truncated cone or a truncated pyramid with a wide mouth, and have a thin opening flange formed around the edge of the opening. Conventionally, such wide-mouthed containers are formed by a compression molding method or a vacuum molding method from polyethylene, polystyrene, or a polyolefine-type plastic sheet such as HIPS or the like.

In more detail, in a conventional method, sheet plastic that is taken from a plastic sheet roll is conveyed via a heating station and is heated to a suitable temperature for molding. Next, the heated plastic is conveyed to a molding station where a mobile mold presses the plastic from above with a predetermined pressing force so that the plastic is pressed downwards into a shaping mold that is positioned below the plastic and a predetermined air pressure is applied. Since a plurality of molding cavities are formed in a matrix in the shaping mold, the sheet plastic is stretched by the air pressure and pressed into each molding cavity so that the plastic is molded into the form of containers. In the next process, trimming is performed by the mobile mold that presses against the sheet plastic from above, so as to cut out each molded container. The remaining frame part of the sheet plastic, which remains after the parts corresponding to the molded containers in the matrix have been cut out, is recycled, though depending on the material used, this frame part may been discarded.

In this way, after sheet plastic of a predetermined length has been sent to the molding station, the conveying of the plastic stops until the molding is complete, and once the molding of a predetermined number of containers is complete, a predetermined amount of the sheet plastic is conveyed once more. This is to say, containers are molded in batches.

The above conventional method for molding wide-mouthed containers has the following problems. First, since wide-mouthed containers with a three-dimensional form are formed from sheet plastic, the deeper the containers are, the thinner the material thickness of the container sides becomes, which makes the containers less rigid and makes it difficult to manufacture wide-mouthed containers with sufficient drop impact strength. In particular, when a wide-mouthed container is made with a predetermined depth or more from a PET material, the strength of the container sides cannot be maintained, which makes manufacturing even more difficult.

A second problem is that around 50% of the sheet plastic is left after molding. When a material, such as PET, that is difficult to recycle is used, there is the problem of a high loss of material.

A third problem is that since the sheet plastic is conveyed to the molding station and a predetermined number of wide-mouthed containers are formed in a batch, it is not possible for a series of molding operations to be efficiently performed in a continuous manner.

OBJECTS AND SUMMARY

In view of the problems described above, it is an object of the present invention to provide a biaxial stretch molding method and apparatus for wide-mouthed containers that can continuously and efficiently manufacture wide-mouthed containers not by using a plastic film but by reheating preforms that are molded in advance and performing biaxial stretch blow molding.

A further object of the present invention is to provide a biaxial stretch molding method and apparatus for wide-mouthed containers that can manufacture wide-mouthed containers with sufficient strength even when the containers are deep.

Yet another object of the present invention is to provide a biaxial stretch molding method and apparatus for wide-mouthed containers that can manufacture wide-mouthed containers without wasting materials.

To achieve the stated objects, the present invention provides a biaxial stretch blow molding method for a wide-mouthed container that molds the wide-mouthed container, which has a shape including an opening flange that extends outwards at an opening part of a cylindrical container main body with a bottom, using biaxial stretch blow molding, the biaxial stretch blow molding method including steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding; and taking out a wide-mouthed container out of the stretch blow molding mold after molding and collecting the wide-mouthed container.

Here, it is preferable for the preform to be conveyed along a conveying path on a single plane.

The present invention is related to a biaxial stretch blow molding apparatus for wide-mouthed containers, including:

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the preform carriers and performing biaxial stretch blow molding; and a collection station for collecting molded wide-mouthed containers from the blow molding station, wherein the preforms are conveyed in an inverted state on the plane by the preform carriers and are transferred to the blow molding station in the inverted state and on the same plane.

Each preform carrier may include a frame-like carrying surface on which an opening flange or an opening end surface of a preform in the inverted state rests.

In this case, each preform carrier may include a heating prevention means for preventing the opening flange and/or screw part of the preform that rests on the frame-like carrying surface from being heated and shrinking and deforming.

Each heating prevention means may include: a cover plate, which is lowered from above the preform on the frame-like carrying surface and is capable of covering the opening flange; and a raising/lowering mechanism for raising and lowering the cover plate.

Also, each preform carrier may preferably include position correcting means for correcting a position of the preform that rests on the frame-like carrying surface.

Each position correcting means may include a core that can be inserted inside the opening flange of the preform via a central opening of the frame-like carrying surface from below the frame-like carrying surface, and a raising/lowering mechanism for raising and lowering the core.

The blow molding station may include a circular circuit and a plurality of stretch blow molding mold assemblies that go around the circular circuit at a predetermined pitch, each of the stretch blow molding mold assemblies may include a first mold and a second mold that are opened and closed relative to one another in a vertical direction, and when the first mold and the second mold are in a closed state, the opening flange of the preform may be held between the first mold and the second mold in a sealed state.

The first mold may be a fixed-side baseplate and the second mold may be a shaping mold that moves up and down.

In this case, a construction may be used where the baseplate includes a rising/falling ring that has an upper surface on which an opening end surface of the preform can be placed and a spring member for holding the upper surface of the rising/falling ring at a position at a same height as an upper surface of the baseplate, and when the shaping mold has been lowered to form a mold clamping state, the rising/falling ring is pressed downwards by the shaping mold and the opening flange of the preform is held between the shaping mold and the baseplate in a sealed state.

When a stretch blow molding mold assembly with the above construction is used, a preform with screw parts may be conveyed along a conveying path with a same height as the upper surface of the baseplate and transferred to the stretch blow molding mold assembly at the same height. When biaxial stretch blow molding is performed by this stretch blow molding mold assembly, the opening flange can be held between the baseplate and the shaping mold in a sealed state.

It is also preferable to include a clamping force increasing means for applying air pressure of predetermined degree, for example, that is equal to the blow air to a rear surface of the shaping mold during clamping.

It is also preferable to include a pressing mechanism for maintaining a clamped state of the shaping mold. This pressing mechanism should preferably include a pressing roller that is in rolling contact with the shaping mold and presses down the shaping mold in the clamped state.

Next, in a case where the carrier circuit includes a linear conveying path section that extends past the heating station and a semicircular conveying path section that is connected to the linear conveying path section, and the blow molding station includes a circular circuit and a plurality of stretch blow molding mold assemblies that go around the circular circuit at a predetermined pitch, a feed pitch of the preforms transported around the semicircular conveying path section can be matched to a feed pitch of the stretch blow molding mold assemblies transported around the circular circuit by adjusting a radius of a movement path taken by preforms that are conveyed around the semicircular conveying path section.

In this case, a transfer means for transferring a preform that is carried by a preform carrier that has reached a preform transfer position of the semicircular conveying path section to a stretch blow molding mold assembly that has reached a preform receiving position of the circular circuit can have the following construction.

A construction may be used where the transfer means includes a slide surface on which an end surface or an opening end surface of the opening flange of a preform slides, an arc-shaped guide that is formed on the slide surface, a rotating disc for sending a preform positioned at the preform transfer position along the arc-shaped guide to a preform receiving position, and semicircular grooves that are formed in an outer circumferential surface at intervals of a predetermined angle, and a preform slides along the slide surface with the preform being held between a semicircular groove and the arc-shaped guide.

On the other hand, a construction may be used where the preform supplying station includes a cylindrical preform supplying cylinder that stores a plurality of preforms, whose posture is inverted, stacked on top of one another, a dropping mechanism for having one preform drop at a time from a lower end opening of the preform supplying cylinder using a plurality of screws, and a starwheel in which a plurality of semicircular pockets, into which the opening flanges or opening end parts of the preforms fit, are concentrically formed, the starwheel receiving a dropped preform in a semicircular pocket that is positioned directly below the lower end opening.

Alternatively, the preform supplying station is constituted so that it has a conveying means such as a conveyer for conveying the preforms directly from an injection-molding machine in which preforms are manufactured and a timing screw for changing a feed pitch of the preforms while being conveyed by the conveying means.

Next, a construction may be used where the collection station includes an air nozzle for blowing upwards a wide-mouthed container that has been collected in an inverted state from the blow molding station, a cylindrical stacker that extends in a vertical direction and receives the wide-mouthed container that has been blown upwards, and a winding up belt mechanism for sending upwards the wide-mouthed container, which has been blown upwards, from a lower end opening of the cylindrical stacker.

Instead, the collection station may be constituted so that it conveys the wide-mouthed containers collected from the blow molding station in an inverted state, sends them outside the apparatus and supplies them directly to a next stage where the wide-mouthed containers are packed in a box, for example.

On the other hand, in a biaxial stretch blow molding apparatus according to the present invention, a construction may be used where the carrier circuit is defined by a driving member such as driving chains. In this case, the carrier circuit may include a linear conveying path section that extends past the heating station and a semicircular conveying path section that is connected to the linear conveying path section.

In this case, each preform carrier may include a horizontal arm linked to an inner end part of the driving member, a mandrel that is mounted on an outer end part of the horizontal arm, and a frame-like carrier surface that is formed on an upper surface of the mandrel.

Here, if the preform carriers that are conveyed along the semicircular conveying path section vibrate or shake as the preform carriers are conveyed, it is not possible to reliably perform an operation that transfers the preforms from this conveying path to other parts of the conveying path. To prevent this from happening, the horizontal arm of each preform carrier should have a joint surface that is formed on each side surface in a conveying direction of an inner end part of the horizontal arm, and the joint surfaces of adjacent preform carriers should come into tight contact with one another while the preform carriers are being conveyed around the semicircular conveying path section.

As one example, the inner end part of the horizontal arm of each preform carrier may be formed with an extended part that extends beyond the driving member, and the joint surfaces may be formed on both side surfaces of the extended part as surfaces that are slanted by a predetermined angle relative to a direction which is perpendicular to a preform conveying direction. These joint surfaces are apart from one another so that the horizontal arms become parallel to one another when preform carriers are being conveyed in the linear conveying path section, so that the joint surfaces do not come into contact, but when the preform carriers are being conveyed in the semicircular conveying path section, the insides of the preform carriers become closer together, so that joint surfaces come into tight contact.

The preform carriers are conveyed with the inner end parts being linked to the driving member, so that during conveying, it is easy for the outer end parts to shake left and right and up and down. For this reason, it is preferable for the horizontal arm of each preform carrier to include an engaged part that is formed on one of two side surfaces in a preform conveying direction, and an engaging part that is formed on another side surface and can engage the engaged part in the preform conveying direction.

With this construction, while each preform carrier is being conveyed on the linear conveying path section, the engaged part of the horizontal arm of each preform carrier is engaged by the engaging part of an adjacent preform carrier, thereby preventing or suppressing the shaking of each preform carrier.

Here, if the engaged part and the engaging part are formed in side surfaces of an outer end part of each horizontal arm, the outer end parts of the preform carriers can be reliably prevented from shaking.

BRIEF DESCRIPTION OF THE DRAWINGS

FIG. 4(a) and FIG. 4(b) are a partially enlarged planar view and a partially enlarged cross-sectional view showing a preform dropping mechanism and part of a starwheel.

FIG. 6(a) is a partial cross sectional view of a part cut along the line VI—VI in FIG. 5, while FIG. 6(b) is a partial planar view showing a preform carrier.

FIGS. 20a and 20b are a view showing one example of a stretch blow molding assembly that is suited to performing biaxial stretch blow molding on preforms with screw parts.

FIGS. 21(a) and 21(b) are a planar view and a cross sectional view showing a preform carrier having a semicircular cover plate.

DETAILED DESCRIPTION OF THE PREFERRED EMBODIMENTS

The following describes, with reference to the drawings, an embodiment of a biaxial stretch blow molding apparatus for wide-mouthed containers according to the present invention.

Wide-Mouthed Container and Example of the Preform

Figure 1:
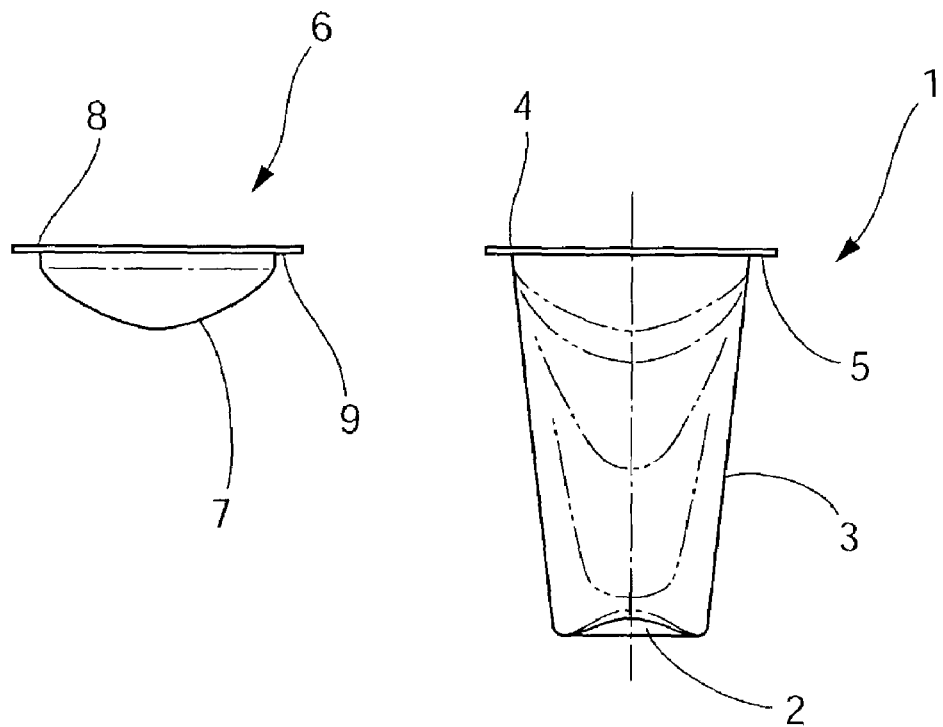
FIGS. 1a and 1b are an explanatory view showing examples of a wide-mouthed container and a preform for the wide-mouthed container.

First, FIG. 1 shows a wide-mouthed container that is manufactured by the biaxial stretch blow molding apparatus of the present embodiment and the shape of a preform for molding the wide-mouthed container. As shown in FIG. 1(a), the wide-mouthed container 1 is formed in a shape where an opening flange 5 is formed so as to extend outwards around an opening edge 4 of a container main body 3 having a bottom 2. The container main body 3 is in the form of a truncated cone that widens out in the form of a taper from the bottom 2 towards the opening edge 4, with the outer diameter being the largest at the opening edge 4.

As shown in FIG. 1(b), a preform 6 that is used by a biaxial stretch blow molding method to form the wide-mouthed container 1 of the shape described above has a shape that includes a stretch molding part 7, which is in the form of a shallow bowl and forms the container main body 3 when biaxial stretch blow molding is performed, and an opening flange 9 that is formed around an opening edge 8 of the stretch molding part 7, is not stretch molded and so is left as it is to form the opening flange 5 of the wide-mouthed container. The stretch molding part 7 is stretched as shown by the imaginary lines in FIG. 1(a) and forms the container main body 3 of the wide-mouthed container 1.

Overall Structure of the Biaxial Stretch Blow Molding Apparatus

Figure 2:
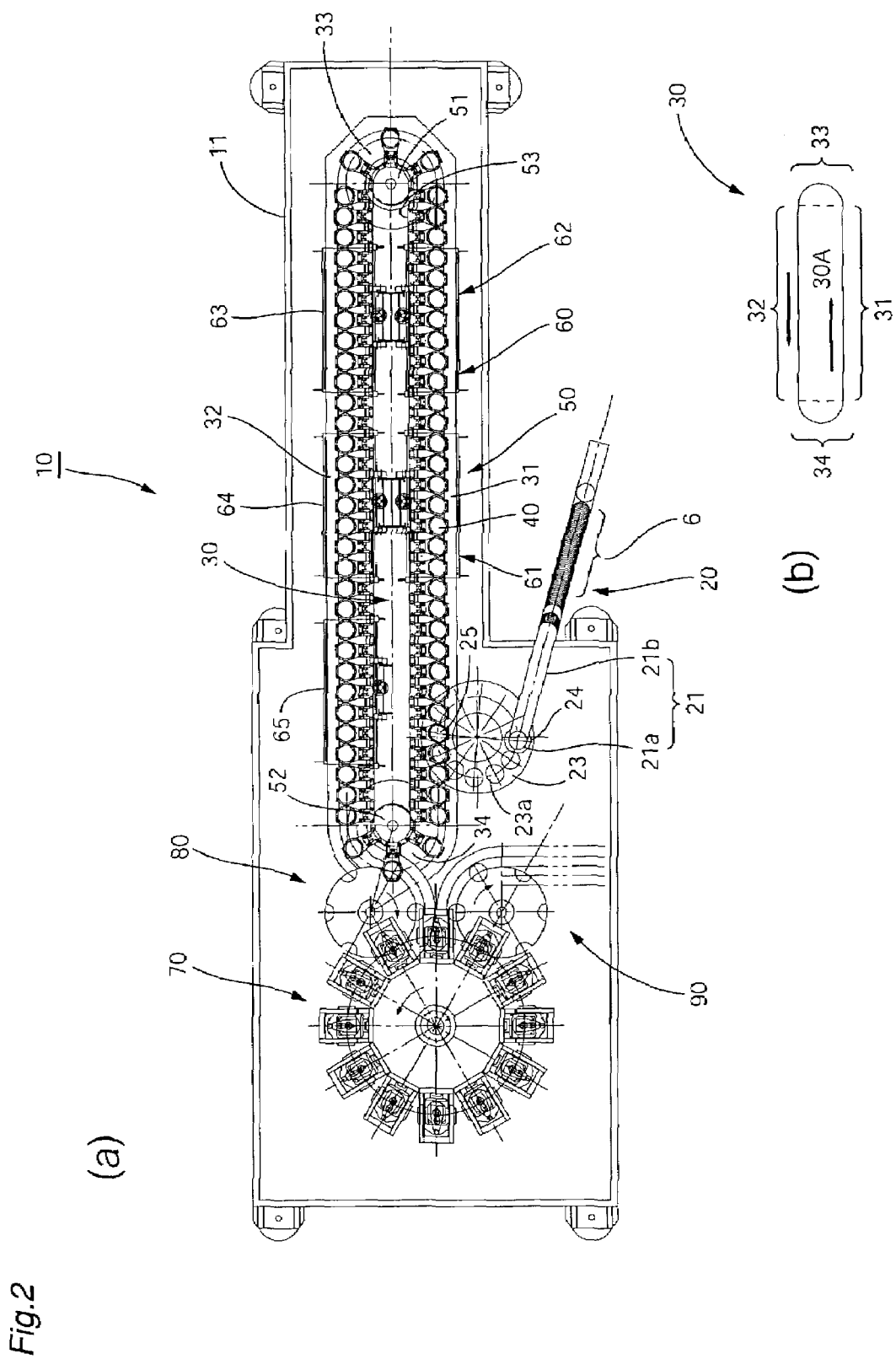
FIGS. 2a and 2b are a simplified planar view of a biaxial stretch blow molding apparatus according to the present invention, and an explanatory view showing the carrier circuit.
Figure 3:
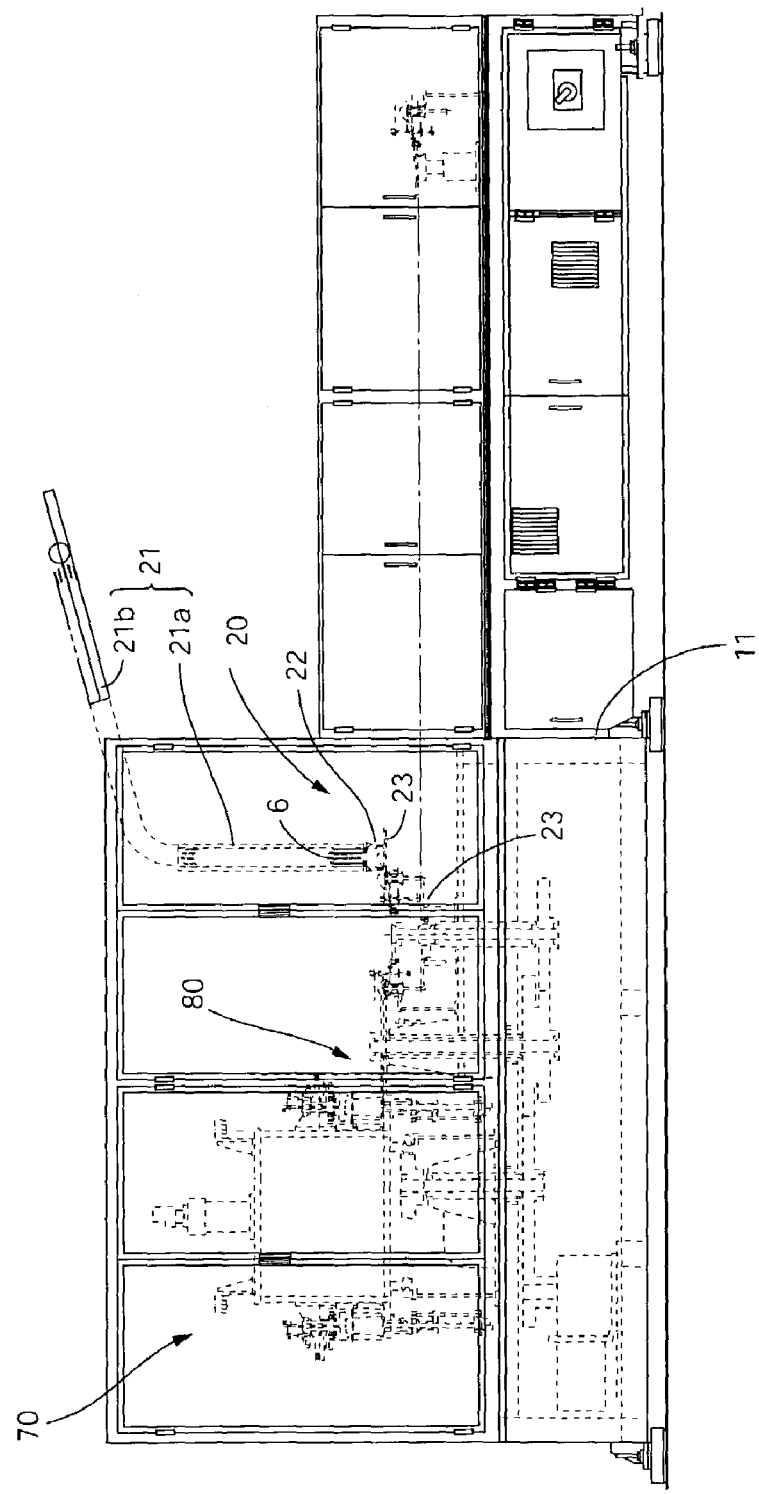
FIG. 3 is a simplified side view of the biaxial stretch blow molding apparatus shown in FIG. 2.

FIGS. 2(a) and 3 are respectively a simplified planar view and a simplified side view of a biaxial stretch blow molding apparatus of the present embodiment. The biaxial stretch blow molding apparatus 10 of the present embodiment heats inverted preforms 6 to a suitable temperature for stretch molding while conveying the preforms 6 on a single plane, continuously conveys the heated preforms 6 in their inverted state on this plane, introduces the preforms 6 into stretch blow molding mold assemblies and performs biaxial stretch blow molding, and then takes the molded wide-mouthed containers from the stretch blow molding mold assemblies and collects the molded wide-mouthed containers.

As shown in FIGS. 2 and 3, the biaxial stretch blow molding apparatus 10 of the present embodiment includes a preform supplying station 20 for supplying the preforms 6, a preform conveying mechanism 50 with a plurality of preform carriers 40 for having the preforms 6 supplied in an inverted state from the preform supplying station 20 go around a loop-shaped carrier circuit 30, and a heating station 60 for heating the preforms 6 that are conveyed by the preform carriers 40 to a suitable temperature for biaxial stretch blow molding. The biaxial stretch blow molding apparatus 10 also includes a blow molding station 70 for subjecting the heated preforms 6 to biaxial stretch blow molding, a transfer station 80 for transferring the heated preforms 6 from the carrier circuit 30 mentioned above to the blow molding station 70, and a collection station 90 for collecting the molded wide-mouthed containers from the blow molding station 70.

Preform Supplying Station

As shown in FIGS. 2 and 3, the preform supplying station 20 includes a cylindrical preform supplying cylinder 21 in which a plurality of preforms 6 are stored on top of one another in an inverted state. This preform supplying cylinder 21 includes a vertical cylindrical part 21a and an inclined cylindrical part 21b that is bent horizontally from the top of the vertical cylindrical part 21a and is slightly inclined with respect to the horizontal. When preforms 6 are inserted opening flange 9 side first into the end opening in the inclined cylindrical part 21b, the preforms 6 are stacked the vertical cylindrical part 21a in an inverted state.

A preform dropping mechanism 22 composed of a plurality of screws is attached to a lower end opening of the vertical cylindrical part 21a of the preform supplying cylinder 21 for dropping preforms 6 one by one from the lower end opening. A starwheel 23 is also disposed for receiving the dropped preforms 6 and transferring the preforms 6 to the preform carriers 40 on the carrier circuit 30.

Figure 7:
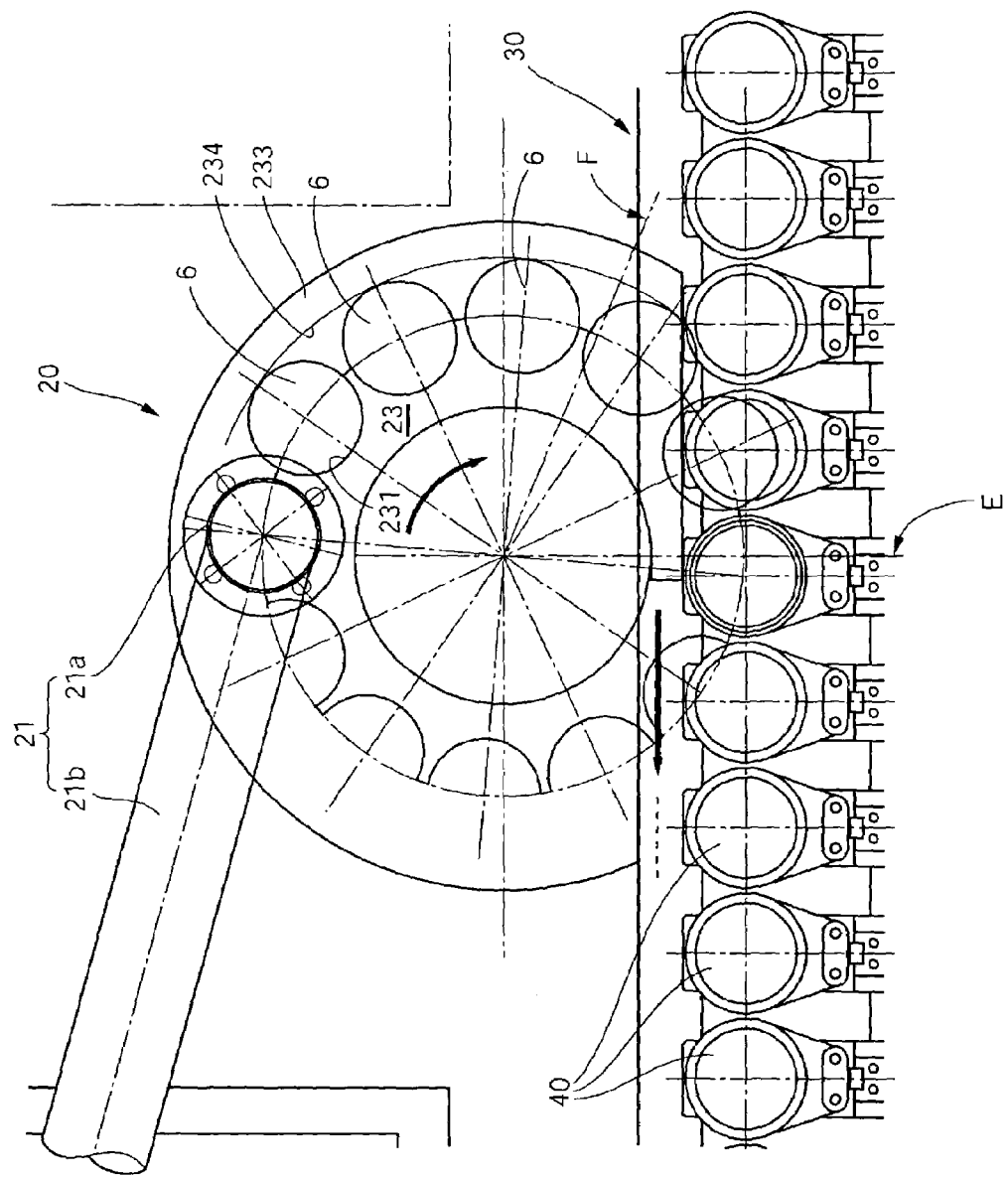
FIG. 7 is a partial planar view showing a preform supplying station.

FIGS. 4(a) and 4(b) are a partially enlarged planar view and a partially enlarged cross sectional view showing the part containing the preform dropping mechanism 22 and the starwheel 23. FIG. 7 is a partial planar view showing the preform supplying station 20.

As shown in these drawings, the preform dropping mechanism 22 of the present embodiment includes a plurality (in the illustrated example, three) of screws 222, 223, 224 that are attached concentrically to a ring-shaped flange 221 that is concentrically attached to the lower end opening 21c of the vertical cylindrical part 21a, with these screws being free to rotate about a vertical axis. The pair of screws 222, 223 that are positioned on opposite sides of the lower end opening 21c in the diameter direction rotate in opposite directions, with the remaining screw 224 that is positioned at a 90° interval from the screws 222, 223 rotating in the same direction as the screw 222. The screws 222 to 224 are respectively provided with spiral feed threads 222a, 223a, 224a. Accordingly, when the screws 222 to 224 rotate, the opening flanges 9 of the preforms 6 fit into the feed threads 222a to 224a so that the preforms 6 are transported downwards and descend vertically. When a preform 6 reaches the lower ends of the screws 222 to 224, the opening flange 9 is released from the screws 222 to 224.

The position at which preforms 6 are released from the screws 222 to 224 is a position 232 that is passed by each semicircular pocket 231 formed in the outer circumference of the starwheel 23. An arc-shaped outer guide plate 233 that extends from this position 232 towards the side of the carrier circuit 30 is also provided. A preform 6 that has been dropped to the position 232 fits into a semicircular pocket 231 of the starwheel 23 that passes this position 232 and is conveyed in an inverted state along an arc-shaped guide side surface 234 of the outer guide plate 233 towards the carrier circuit 30. This is to say, the opening flange 9 that lies on the surface of a horizontal fixed baseplate 235 slides over this surface.

After this, a preform 6 is conveyed in its inverted state along a conveying surface that has the same height as the fixed baseplate 235 and is subjected to biaxial stretch blow molding, after which the molded wide-mouthed container is conveyed along the same conveying surface so as to reach a collection station 90.

Preform Conveying Mechanism and Preform Carriers

As shown in FIG. 2, a preform conveying mechanism 50 includes a driving sprocket 51 and a driven sprocket 52 that are supported so as to be free to rotate by an apparatus mount 11, a drive chain 53 that is suspended between the driving sprocket 51 and the driven sprocket 52, and a rotational driving source (not shown in the drawing) for rotationally driving the driving sprocket 51. A carrier circuit 30 in the form of a loop is defined by the drive chain 53. As shown in FIG. 2(b), the carrier circuit 30 is a loop-shaped carrier circuit with two linear conveying path sections 31, 32 that extend along a heating station 60 on both sides and two semicircular conveying path sections 33, 34 that link both ends of the two linear conveying path sections 31, 32.

Figure 5:
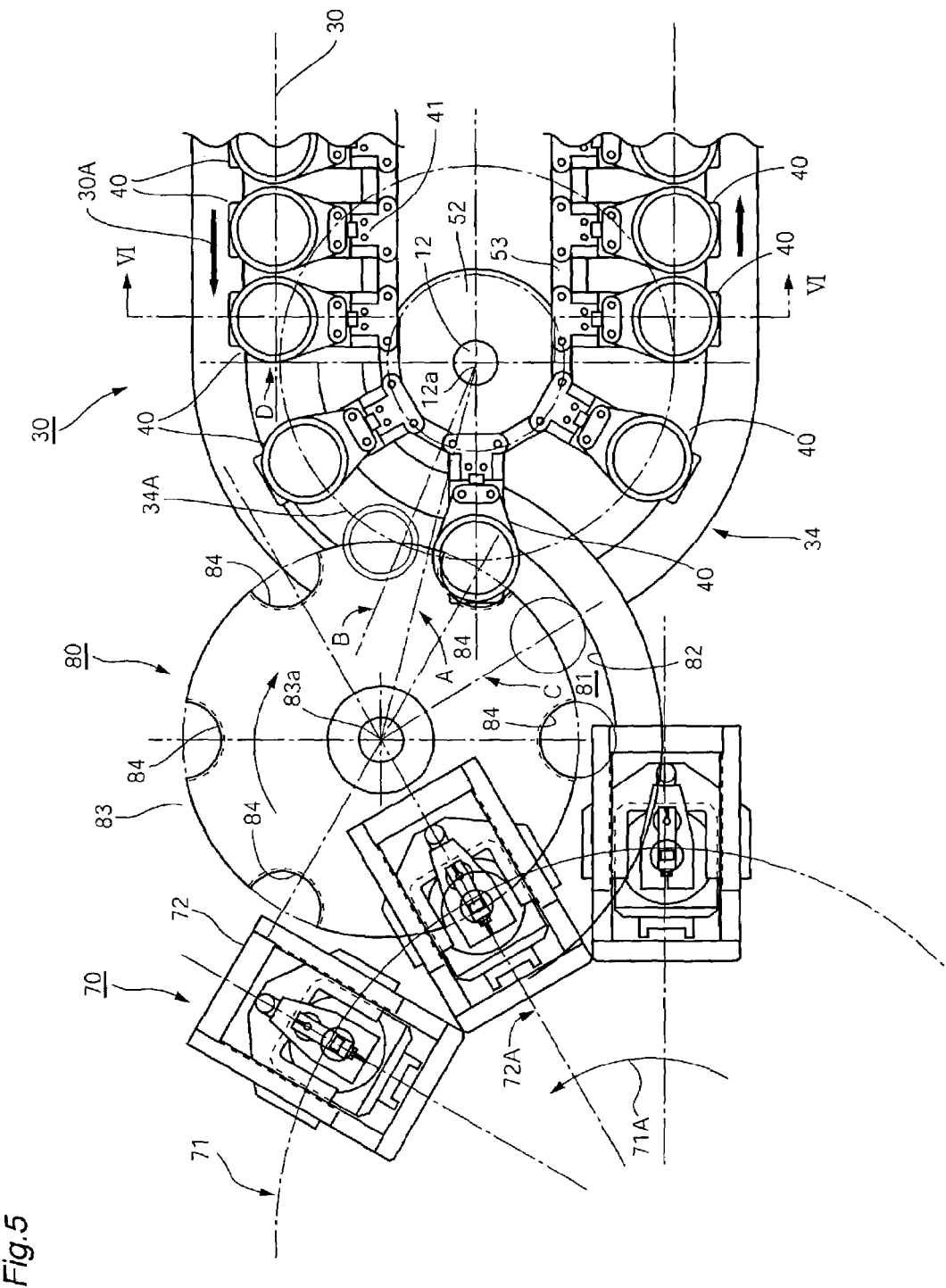
FIG. 5 is a partial planar view showing the carrier circuit, a passing station, and a stretch molding station.
Figure 6:
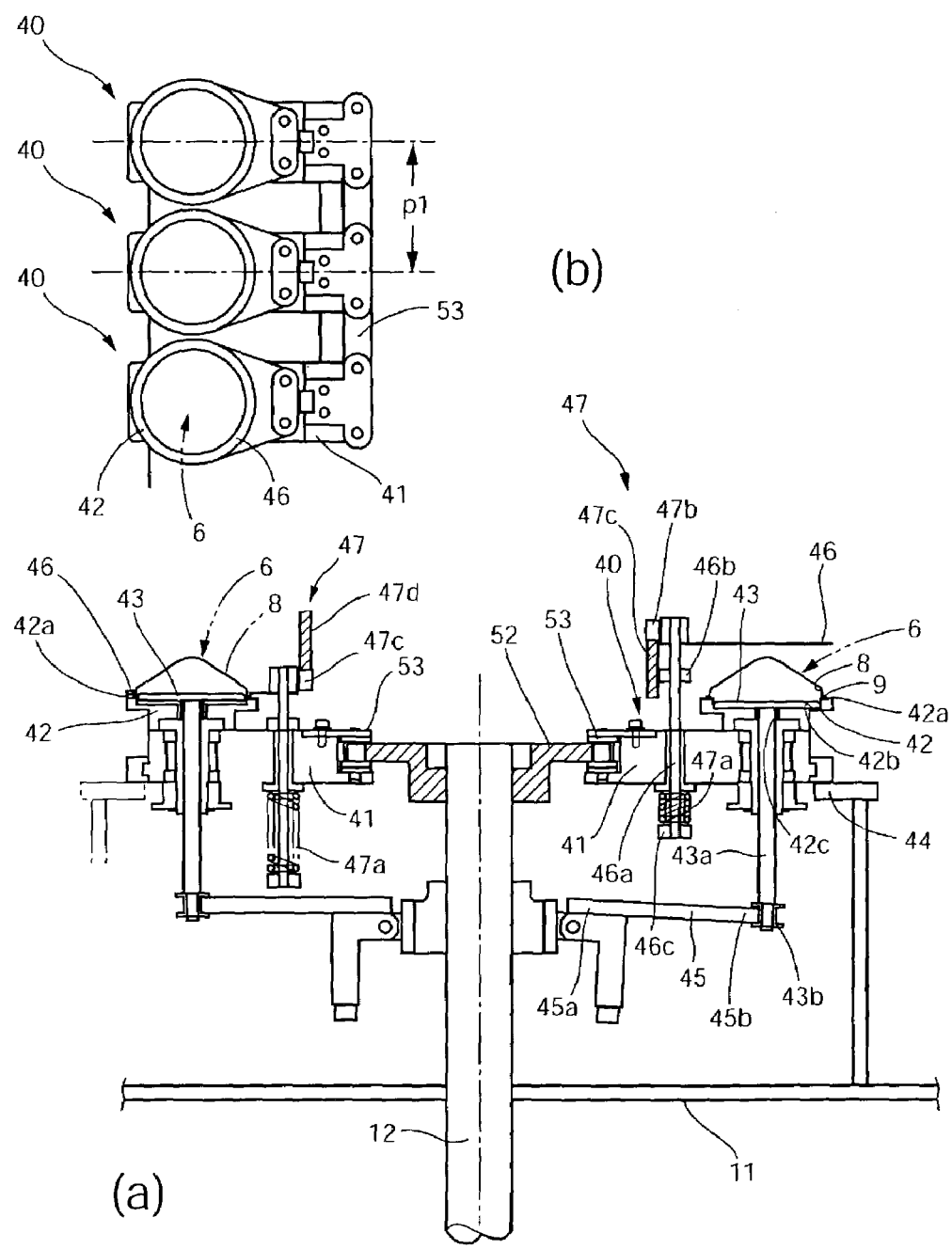

FIG. 5 is a partial planar view showing the carrier circuit 30, the transfer station 80, and the blow molding station 70, while FIG. 6 is a partial cross sectional view taken along the line VI—VI shown in FIG. 5 and a partial planar view showing a preform carrier.

As can be understood from FIGS. 2(a), 5, and 6, the driven sprocket 52 is supported so as to be free to rotate at the top end of a rotational center shaft 12, which is perpendicularly fixed to the apparatus mount 11, with the drive chain 53 being suspended on the driven sprocket 52. The preform carriers 40 are attached to the drive chain 53 at a regular pitch (the carrier conveying pitch) p1.

As shown in FIGS. 5 and 6, each preform carrier 40 includes a horizontal arm 41 that is linked to the drive chain 53 and a mandrel 42 that is mounted on the front tip of the horizontal arm 41. The end of the horizontal arm 41 is supported by a guide plate 44 so as to be free to slide on the guide plate 44 that is attached to the apparatus mount 11 so that the drive chain 53 becomes horizontal, resulting in the horizontal arm 41 moving with a horizontal posture.

A ring-like bearing surface 42a (frame-like bearing surface) on which the opening flange 9 of an inverted preform 6 rests is formed on the upper surface of each mandrel 42. The ring-like bearing surface 42a is positioned on a same plane as the surface of the fixed baseplate 235 of the starwheel 23 in the preform supplying station 20, the inner diameter of the ring-like bearing surface 42a is approximately equal to the inner diameter of the opening flange 9, and the outer diameter of the ring-like bearing surface 42a is larger than the outer diameter of the opening flange 9. It should be noted that the ring-like bearing surface 42a is in the form of a frame that corresponds to the shape of the opening flanges of the preforms to be conveyed.

Position Correcting Means

A position correcting means is provided in each preform carrier 40 for correcting the carrying position so that the center of a preform 6 placed on a ring-like bearing surface 42a is aligned with the center of the ring-like bearing surface 42a. The position correcting means in the present embodiment includes a core 43 that can be inserted into the opening edge 8 of the preform 6 from below the ring-like bearing surface 42a and a raising/lowering mechanism for raising and lowering the core 43.

As shown in FIG. 6, a shallow, circular concave part 42b is formed on the inside of the ring-like bearing surface 42a, with a central through-hole 42c extending through this circular concave part 42b in a vertical direction. A core shaft 43a passes through the central through-hole 42c and is free to slide, with a disc-like core 43 that is large enough to fit into the circular concave part 42b being horizontally attached to the top end of this core shaft 43a. When the core 43 is projected upwards from a state shown on the right side of FIG. 6(a) where the core 43 is held inside the circular concave part 42b to the state shown on the left side of FIG. 6(b), the core 43 is inserted from below into the opening edge 8 of the preform 6 that lies on the ring-like bearing surface 42a and aligns the center of the preform 6 with the center of the ring-like bearing surface 42a. It should be noted that the outer circumferential surface of the core 43 is tapered in the shape of a cone that gets narrower towards the top, so that the centering of the preform 6 is performed smoothly.

In the present embodiment, the raising/lowering mechanism that raises and lowers the preform 6 includes a guide rail 45 that is disposed along the drive chain 53 at a position below the drive chain 53, with an inner end 45a of the guide rail 45 being attached to the side of the apparatus mount 11 and an outer end 45b fitting into a pulley 43b as a rail groove that is attached to the bottom end of the core shaft 43a so that the outer end 45b is free to slide. The height of the outer end 45b of the guide rail 45 changes along the carrier circuit 30 (along the drive chain 53). Accordingly, while the preform carriers 40 are moving along the carrier circuit 30, the cores 43 are raised and lowered between the position shown on the right side in FIG. 6A and the raised position shown on the left side.

The following describes the timing at which the core 43 is raised, with reference to FIGS. 5 and 7. At a point when a preform 6 that is carried by a preform carrier 40 is positioned with its center on a line A that joins a rotational center 12a of the semicircular conveying path section 34 of the carrier circuit 30 and a rotational center 83a of the starwheel 83 of the transfer station 80 (which is to say, when a preform 6 is at the transfer position), the core 43 needs to be in a completely lowered position. The lowering of the core 43 should commence before this point is reached, such as at a point shown by the line B in FIG. 5. As described later, at the point shown by the line B, the preform 6 is restrained by the pocket (semicircular groove) 84 of the starwheel 83 and a hard guide side plate 82, so that the position of the preform 6 does not change.

The lowered core 43 is held in the lowered position until a new preform 6 is supplied to the preform carrier 40. After a new preform 6 has been supplied to the preform carrier 40 at a supply position in the preform supplying station 20 that is shown by the line E in FIG. 7, it is necessary to raise the core 43 from the lowered position to correct the positioning of the preform 6.

Heating Prevention Means

The preform carriers 40 of the present embodiment are each provided with a heating prevention means that prevents the opening flange 9 of a preform 6 from being heated and shrinking or deforming while the preform 6 is passing the heating station 60. As shown in FIG. 6, the heating prevention means includes a ring-shaped cover plate (frame shaped cover plate) 46 that is lowered onto a preform 6 on a ring-like bearing surface 42a from above and can cover the opening flange 9, and a raising/lowering mechanism 47 for raising and lowering the cover plate 46.

The cover plate 46 is attached horizontally to an upper end of a raising/lowering shaft 46a that is attached to the horizontal arm 41 so as to be able to move up and down. An upper stopper 46b and a lower stopper 46c for defining the raised and lowered positions are provided on the raising/lowering shaft 46a.

The raising/lowering mechanism 47 includes a coil spring 47a that continuously presses the raising/lowering shaft 46a down, a cam follower 47b shaped like a roller that is attached to the upper part of the raising/lowering shaft 46a, and a raising cam 47c and a lowering cam 47d along which the cam follower 47b moves. When the cover plate 46 is raised, the cam follower 47b is raised on the cam surface of the raising cam 47c and the raising/lowering shaft 46a rises against the spring force of the coil spring 47a. On the other hand, when the cover plate 46 is lowered, the raising/lowering shaft 46a is pulled down by the spring force and the cam follower 47b slides along the cam surface of the lowering cam 47d, so that the cover plate 46 is held in the lowered position.

When a preform 6 is supplied from a preform supplying station 20 to the preform carrier 40, and when a preform 6 is transferred from a preform carrier 40 to the transfer station 80, the cover plate 46 is retracted upwards as shown on the right side in FIG. 6(a). At other times, the cover plate 46 covers the opening flange 9 of the preform 6 from above, as shown on the left side in FIG. 6(a).

This is to say, the raising of the cover plate 46 is commenced at the point shown by the line D in FIG. 5, with the raising complete position being the point shown by the line A in FIG. 5. The lowering of the cover plate 46 is commenced at the point shown by the line E in FIG. 7, and the lowering complete position is the point after the transfer of a preform 6 to the preform carrier 40 from the starwheel 23 has been completed, which is to say, the point shown by the line E in FIG. 7.

Heating Station

As shown in FIG. 2, the heating station 60 includes first and second heating units 61, 62 that arranged in the carrier conveying direction 30A along the linear conveying path section 31 of the carrier circuit 30. The heating station 60 also includes third, fourth, and fifth heating units 63, 64, 65 that are also arranged in the carrier conveying direction 30A along the other linear conveying path section 32. Each of these heating units may be composed, for example, of a cover that has an inverted U-shape and an infra red lamp that is arranged along the carrier circuit 30 on the inside of the cover. By passing the last heating unit 65, a preform 6 carried by a preform carrier 40 is heated to a suitable temperature for biaxial stretch blow molding, and is then transferred to the blow molding station 70 by the transfer station 80.

Blow Molding Station

Figure 8:
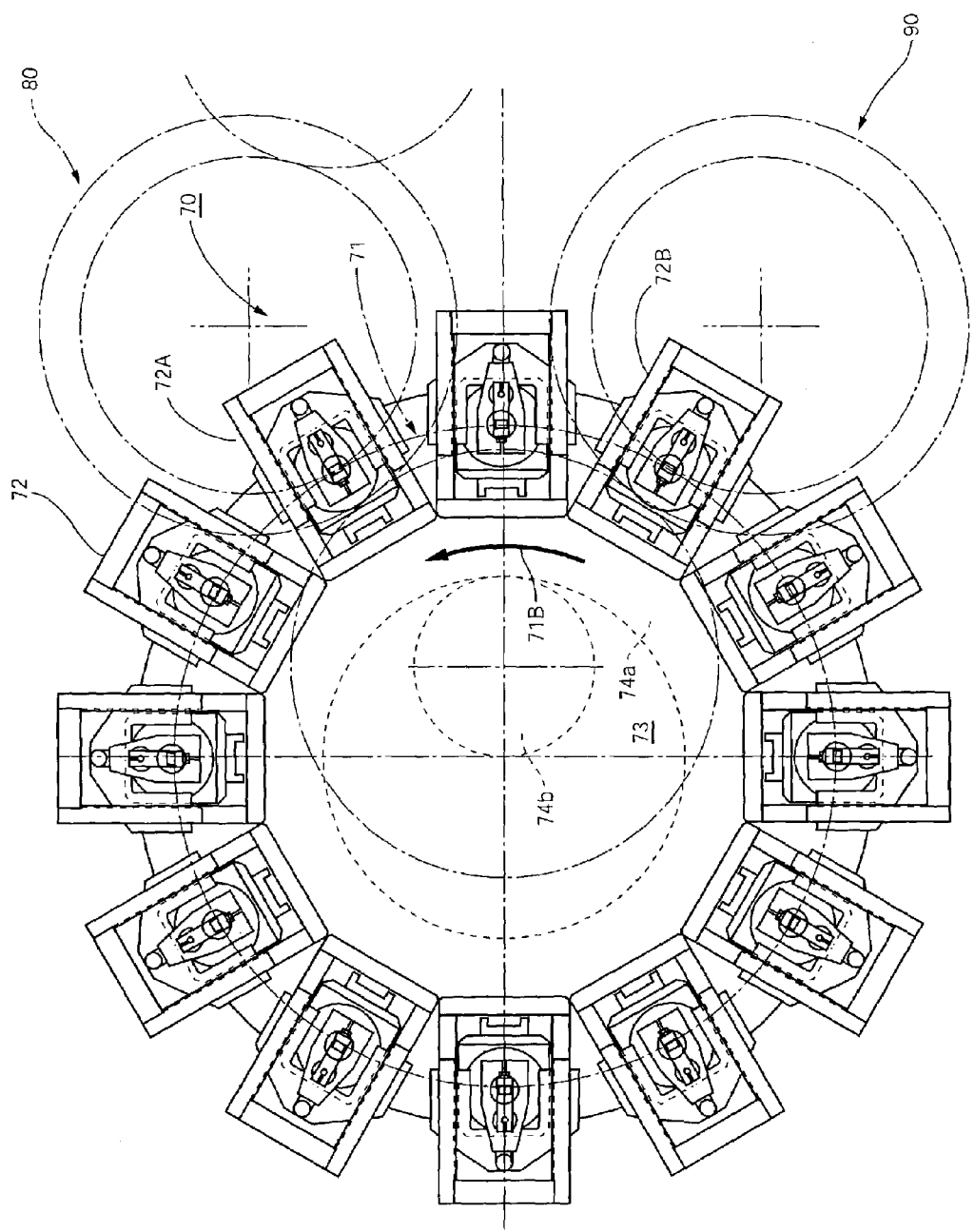
FIG. 8 is a planar view showing a blow molding station.
Figure 9:
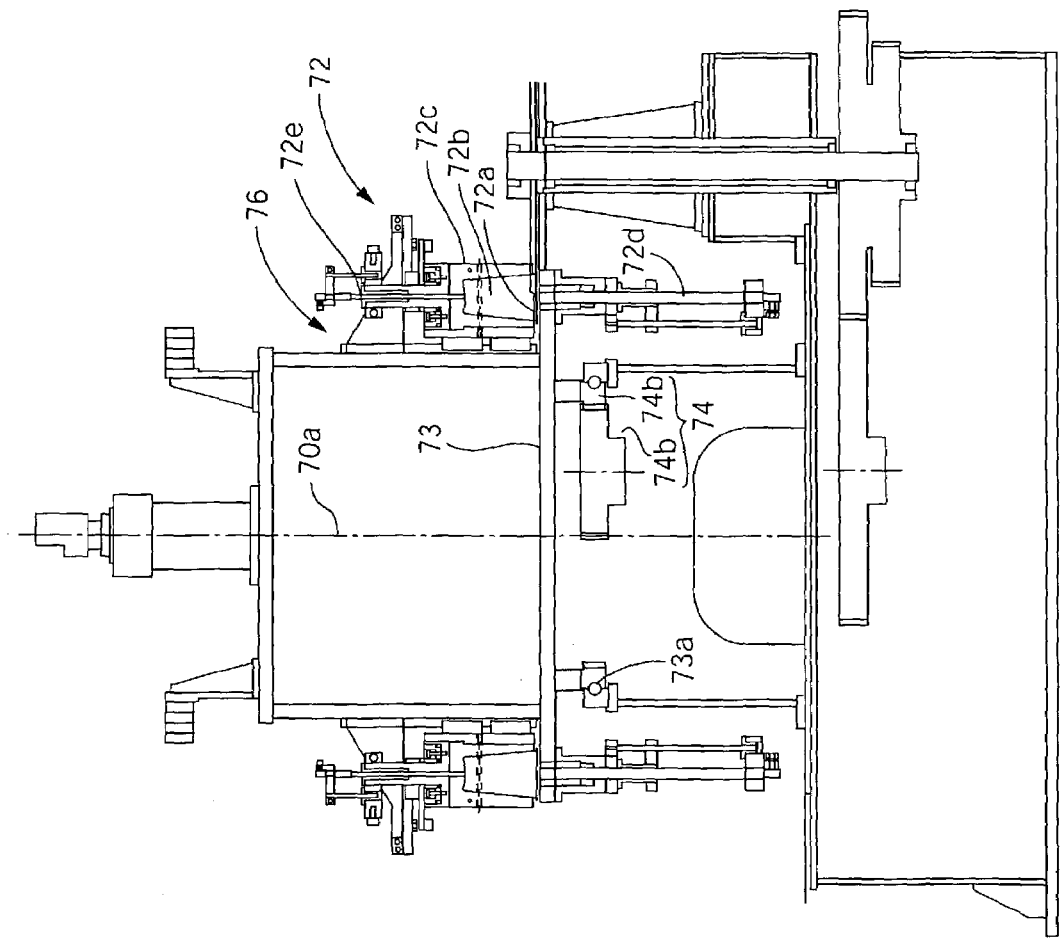
FIG. 9 is a cross sectional view showing the blow molding station.
Figure 10:
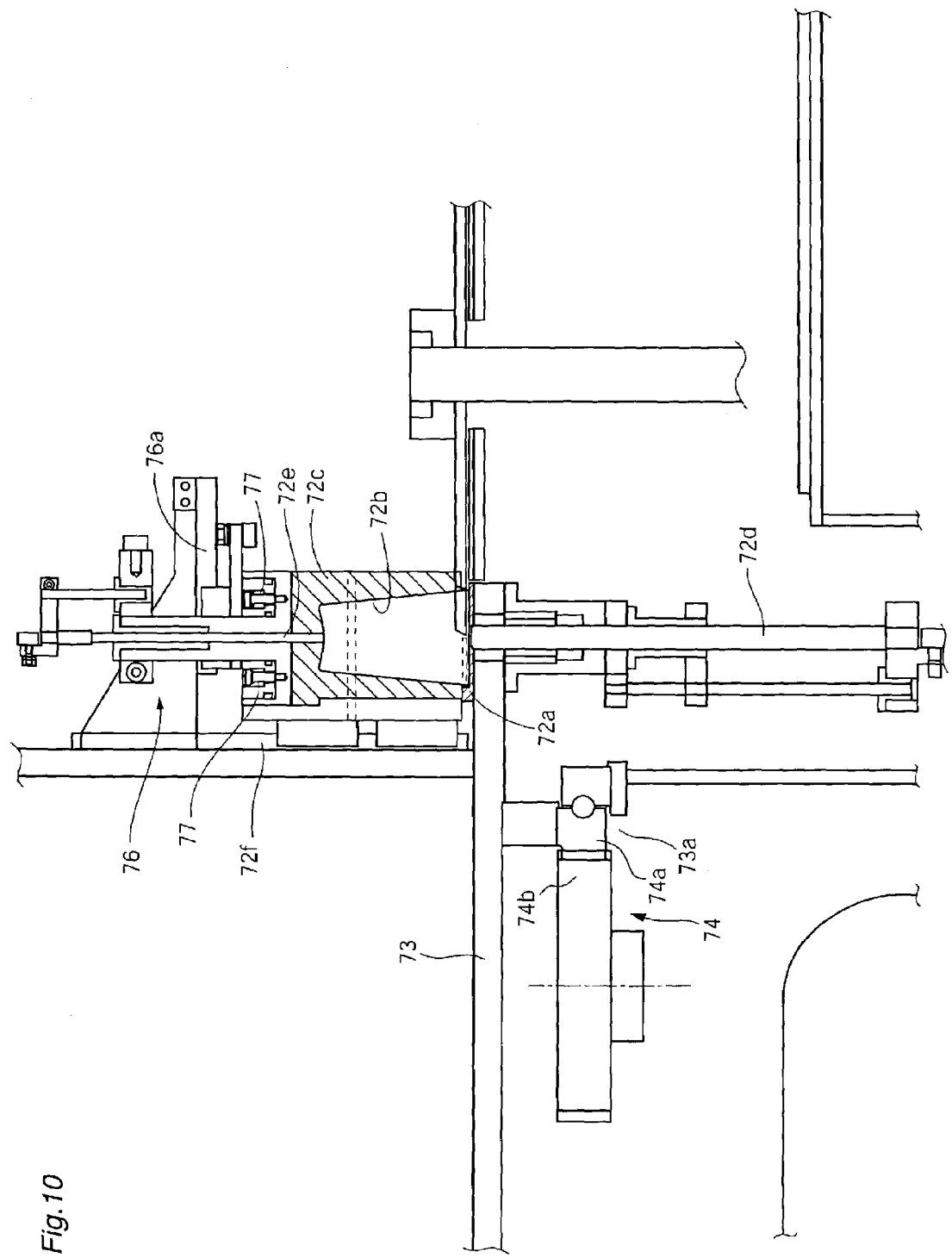
FIG. 10 is an enlarged partial cross sectional view in which part of the blow molding station has been enlarged.

FIGS. 8 and 9 are a planar view and a cross sectional view of the blow molding station 70. FIG. 10 is a partial cross sectional view of a blow molding mold. As shown in these drawings, the blow molding station 70 is constructed so that a plurality of stretch blow molding molds 72 with a fixed pitch go around a circular looped path 71 in the direction shown by the arrow 71B. Each of the stretch blow molding molds 72 receives a preform 6 that has been heated to a suitable temperature for molding from the transfer station 80 at a preform receiving position 72A. Then a stretch blow molding mold 72 passes a molded container removing position 72B, the molded wide-mouthed container 1 (see FIG. 1(a)) is collected by the collection station 90.

In more detail, the blow molding station 70 includes a rotating disc 73 that is free to rotate about a vertical axis 70a, with the rotating disc 73 being supported, via a radial thrust bearing 73a, by the apparatus mount 11 so as to be free to rotate. The rotating disc 73 is also capable of being rotationally driven in the direction shown by the arrow 71B by a rotational force that is transmitted from a rotational driving source (not shown in the drawing) via a gear mechanism 74 including an internal gear 74a that is concentrically fixed onto a rear surface of the rotating disc 73 and an external gear 74b that engages the internal gear 74a.

A plurality of stretch blow molding mold assemblies 72 are concentrically mounted on the rotating disc 73 at a regular pitch. Each stretch blow molding mold assembly 72 includes a fixed-side baseplate 72a that is attached to the rotating disc 73, a moving side shaping mold 72c that includes a molding cavity 72b that is disposed directly above the baseplate 72a, and a stretching rod 72d that passes through the center of the baseplate 72a and can be raised and lowered. Pressurizing air for stretch blow molding can be supplied to the cavity through the center of the stretching rod 72d.

Directly above the shaping mold 72c, an eject pin 72e extends concentrically with the shaping mold 72c, with the eject pin 72e being capable of ejecting a wide-mouthed container from the inside of the cavity 72b after molding. The shaping mold 72c can be raised and lowered along a raising/lowering rail 72f that is attached to the rotating disc 73, by a mold opening/closing mechanism 76 that is composed of a cam mechanism or the like. The state shown in FIG. 10 is the closed mold position, with the open mold position being a position where the shaping mold 72c has been raised by a predetermined distance from this closed mold position.

Each shaping mold 72c is raised and lowered in accordance with its rotational angle position. As shown in FIG. 8, between a rotational angle position just before the molded container removing position 72B and the preform receiving position 72A the shaping mold 72c is in a raised position (the open mold position). On passing the preform receiving position 72A, the shaping mold 72c starts to be lowered and the shaping mold 72c reaches a closed mold position where shaping mold 72c is pressed onto the baseplate 72a. After this, biaxial stretch blow molding is performed and after the molding operation is complete, the shaping mold 72c starts to be raised once again and is placed back in the open mold position by the time the molded container removing position 72B is reached.

The stretch blow molding molds 72 of the present embodiment are characterized in that the mold is opened and closed by an up/down movement and in that when the mold has been closed by lowering a shaping mold 72c that can move up and down, the opening flange 9 of a preform 6 is held both above and below by the shaping mold 72c and the baseplate 72a, so that a sealed state is automatically produced.

Figure 11:
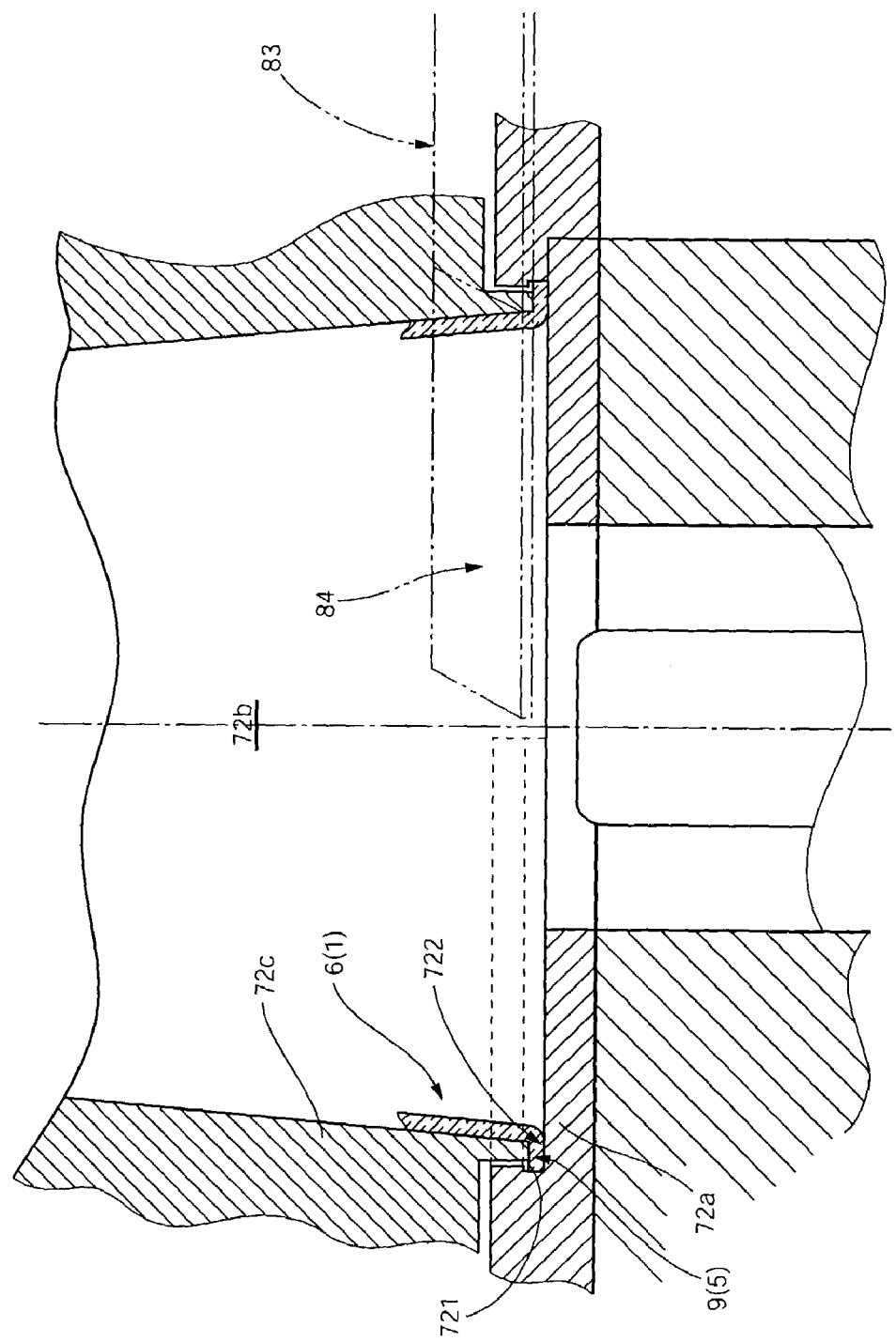
FIG. 11 is an enlarged partial cross sectional view in which part of the blow molding station has been further enlarged.

This is to say, as shown by the enlargement in FIG. 11, the opening flange 9 of a preform 6 is held between a lower end surface 721 of the shaping mold 72c and a surface part 722 of the baseplate 72a, thereby sealing the cavity 72b. This sealed state is maintained while biaxial stretch blow molding is performed, so that the wide-mouthed container 1 is molded.

The present embodiment also includes a mold clamping force increasing means that applies the same air pressure as the blow air to the shaping mold 72c during the clamping of the mold. In other words, as shown in FIG. 10, the shaping mold 72c is supported by the mold opening/closing mechanism 76, with an air pressure compartment 77, into which the blow air is introduced, being formed between a mold supporting plate 76a of the mold opening/closing mechanism 76 and the shaping mold 72c. When blow air is introduced into the cavity 72b with the mold in the clamped state, blow air is simultaneously introduced into the air pressure compartment 77. As a result, the blow air that is added to the cavity 72b during molding prevents rupturing of the seal between the baseplate 72a and the shaping mold 72c.

In addition, if necessary, it is possible to supply the air pressure compartment 77 with a pressure different from that of the blow air via a reducing valve.

Pitch Changing Mechanism and Transfer Station

At the heating units 61 to 65 of the heating station 60 that are arranged along the carrier circuit 30, making the intervals between the preforms 6 extremely narrow makes the biaxial stretch blow molding apparatus compact and is effective in raising the heat efficiency. In the blow molding station 70, however, the intervals need to be increased due to the size of the stretch blow molding mold assemblies 72 and the space required by the driving mechanism. For this reason, the conveying intervals (pitch) need to be changed between the heating station 60 and the blow molding station 70, with the mechanism for performing this operation playing an extremely important role in making the apparatus compact and speeding up the operation of the apparatus.

In the present embodiment, using a chain as described below to change the pitch makes it possible to change the pitch with a much simpler construction than conventional methods where a cam is used.

Figure 12:
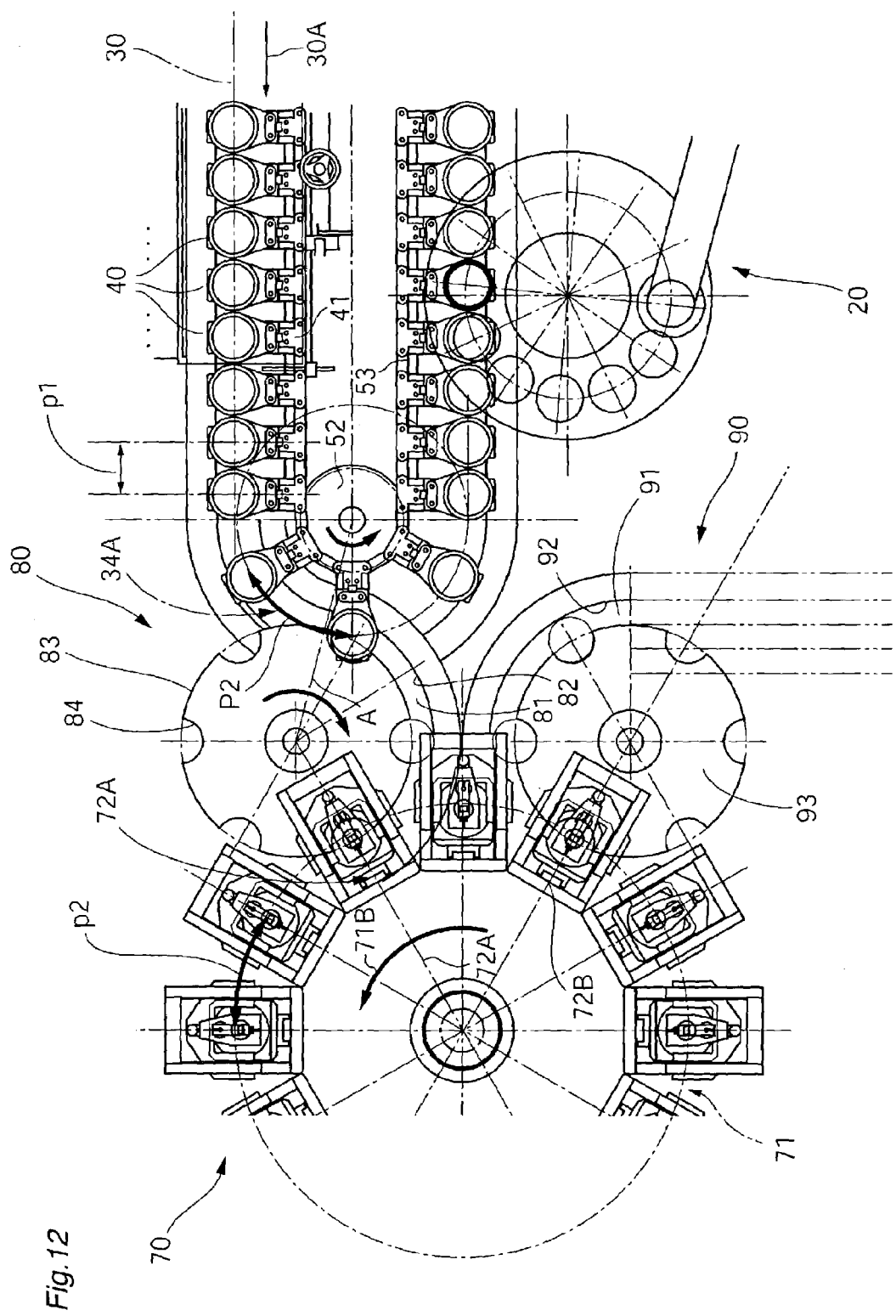
FIG. 12 is a partial planar view showing the transfer station.

As shown in FIGS. 5 and 12, in the blow molding station 70, a plurality of stretch blow molding mold assemblies 72 move around the circular looped path 71 in the direction shown by the arrow 71B with a fixed pitch p2. Along the linear conveying path sections 31, 32 of the carrier circuit 30, however, the preform carriers 40 move around in the direction shown by the arrow 30A with the fixed pitch p1. In the present embodiment, the preforms 6 are transferred from the carrier circuit 30 to the circular looped path 71 at the semicircular conveying path section 34 of the carrier circuit 30, with the feed pitch being set to the feed pitch p2 of the circular looped path 71 at this part.

This is to say, by adjusting the radius of the movement path taken by the preforms 6 that are conveyed on the semicircular conveying path section 34 of the carrier circuit 30, the feed pitch of the preforms 6 conveyed on the semicircular conveying path section 34 can be matched to the feed pitch of the stretch blow molding mold assemblies 72 conveyed on the circular looped path 71.

In the present embodiment, the semicircular movement path 34A taken by the preforms 6 can be adjusted by adjusting the radius of the driven sprocket 52 on which the drive chain 53 is suspended and the length of the horizontal arms 41 of the preform carriers 40 that are attached to the drive chain 53.

As a result, the preforms 6 that are conveyed on the semicircular conveying path section 34 pass the transfer position A with a fixed time interval. In the same way, the stretch blow molding mold assemblies 72 pass the receiving position 72A on the circular looped path 71 with the same time interval. Therefore, by using a starwheel 83 that has the same radius as the rotational radius of the movement path 34A of the preforms 6 and rotates with the same peripheral velocity as the movement speed of the preforms 6, the preforms 6 can be transferred from the carrier circuit 30 to the circular looped path 71.

As shown in FIGS. 5 and 8, the transfer station 80 has a horizontal sliding surface 81 on which the opening flanges 9 of the preforms 6 slide, a guide side surface 82 that is formed in an arc shape on the sliding surface 81, and the starwheel 83 for sending the preforms 6 on the movement path 34A along the guide side surface 82 to the preform receiving position 72A. Pockets (semicircular grooves) 84 are formed at intervals of a fixed angle in the outer circumferential surface of the starwheel 83. When the starwheel 83 is rotated, the pockets 84 pass the transfer position A on the semicircular conveying path section 34 at a point when the preform carriers 40 on the carrier circuit 30 pass this transfer position A, so that the preforms 6 are received from the preform carriers 40. The opening flanges 9 of the inverted preforms 6 are held between the pockets 84 and the arc-shaped guide side surface 82, so that the opening flanges 9 slide along the sliding surface 81 and are transferred to the stretch blow molding mold assemblies 72 that pass the preform receiving position 72A.

Collection Station

Figure 13:
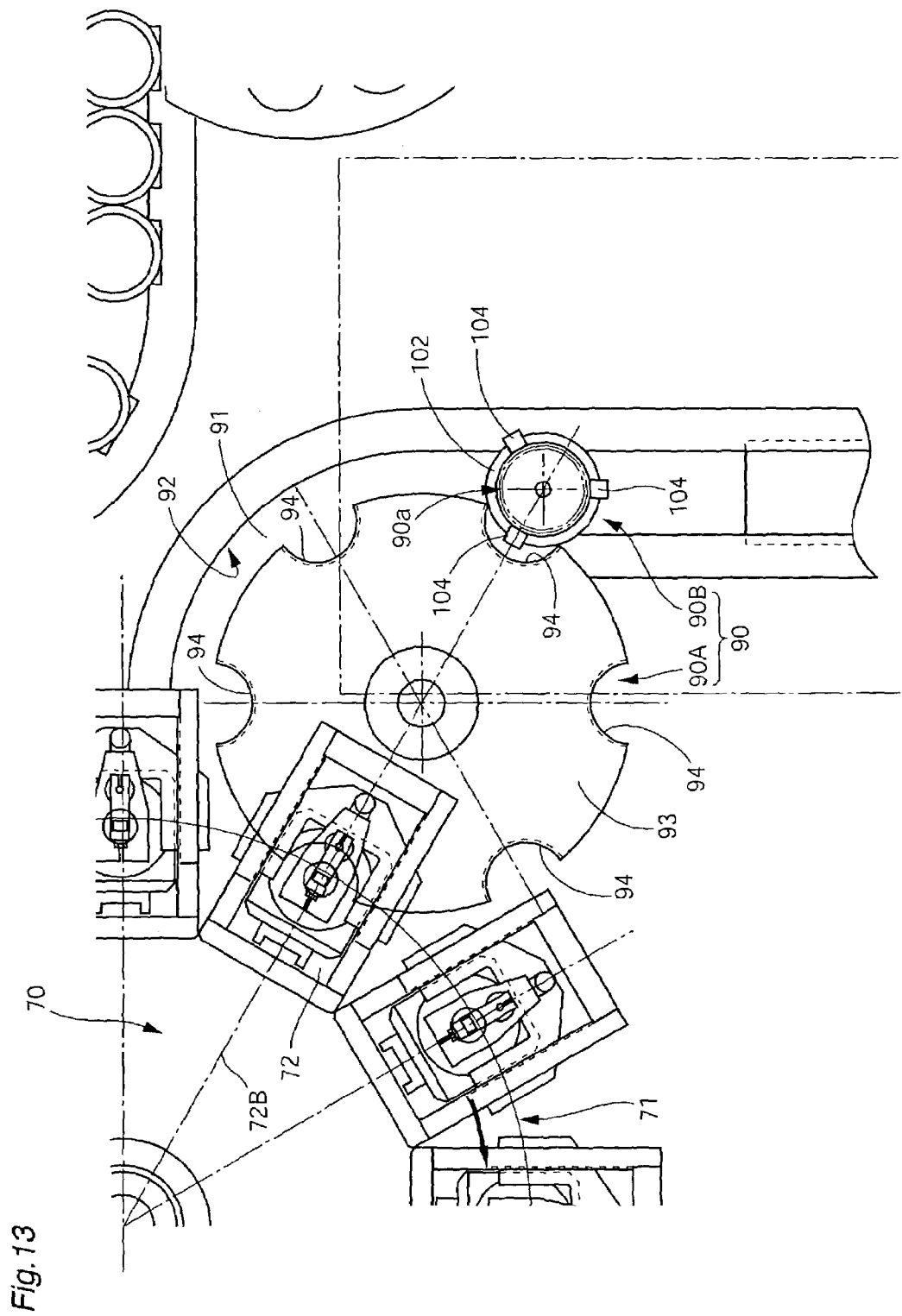
FIG. 13 is a partial planar view showing a container collection station.
Figure 14:
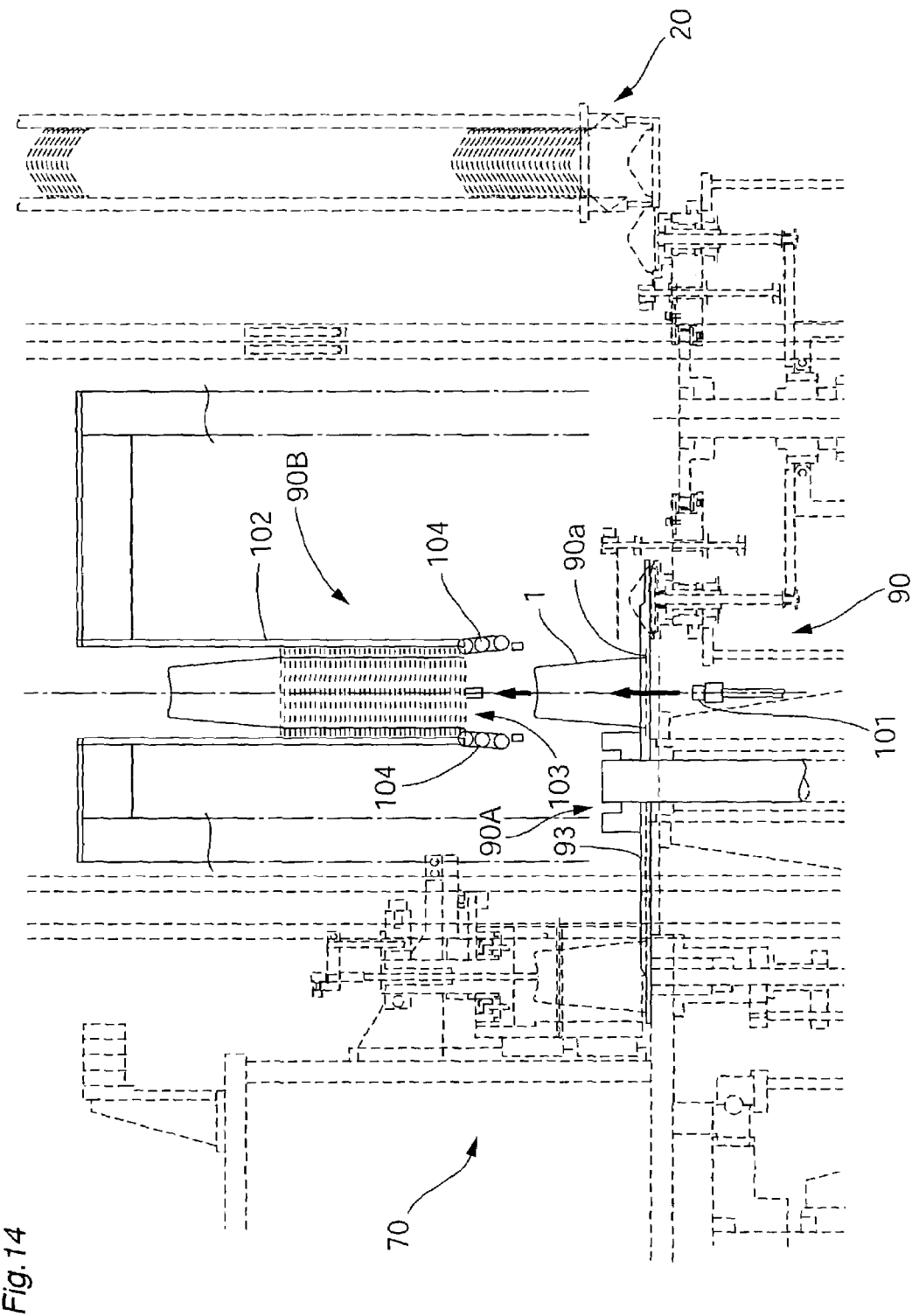
FIG. 14 is a partial cross sectional view showing the container collection station.

FIGS. 13 and 14 are a partial planar view and a partial cross-sectional view showing the collection station 90. As shown in these drawings, the collection station 90 is fundamentally composed of a transfer apparatus 90A that has the same construction as the transfer station 80 described above and a container loading apparatus 90B that loads the wide-mouthed containers 1 that have been collected by the transfer apparatus 90A by stacking the wide-mouthed containers 1 on top of each other.

The transfer apparatus 90A has a horizontal sliding surface 91 on which the opening flanges 5 of the wide-mouthed containers 1 slide, an arc-shaped guide side surface 92 that is formed on the sliding surface 91, and a starwheel (rotating disc) 93 that takes the wide-mouthed containers 1 out of the opened stretch blow molding mold assemblies 72 that pass the molded container removing position 72B and sends the wide-mouthed containers 1 along the guide side surface 92 to the container loading apparatus 90B. Pockets (semicircular grooves) 94 are formed at intervals of a fixed angle in the outer circumferential surface of the starwheel 93.

When the starwheel 93 is rotated, the pockets 94 pass the molded container transfer position 72B of the circular looped path 71 at the point when the stretch blow molding mold assemblies 72 pass this position and so take the wide-mouthed containers 1 out of the stretch blow molding mold assemblies 72. The inverted wide-mouthed containers 1 are held between the pockets 94 and the guide side surface 92 and the opening flanges 5 of the wide-mouthed containers 1 slide along the sliding surface 91 so that the wide-mouthed containers 1 are sent towards the container collection position 90a by the container loading apparatus 90B.

The container loading apparatus 90B has an air nozzle 101 for lifting the containers by blowing that is disposed directly below the container collection position 90a, a cylindrical stacker 102 that is disposed directly above the container collection position 90a, and a plurality of lifting belt mechanisms 104 that are concentrically disposed along an outer circumferential edge part of a lower end opening 103 of the cylindrical stacker 102. In the present embodiment, three lifting belt mechanisms 104 are disposed at intervals of an equal angle.

When a wide-mouthed container 1 reaches the container collection position 90a, air for lifting the wide-mouthed container 1 is blown upwards from the air nozzle 101. The wide-mouthed container 1 is lifted by this lifting air, and is inserted into the cylindrical stacker 102 between the lifting belt mechanisms 104 that are positioned directly above the container collection position 90a. By doing so, lifted wide-mouthed containers 1 are sent upwards by the lifting belt mechanisms 104 and as shown in FIG. 14, are loaded into the cylindrical stacker 102 one after the other from the bottom.

It should be noted that the after a predetermined number of wide-mouthed containers 1 have been stacked in the cylindrical stacker 102, the wide-mouthed containers 1 that are stacked in the cylindrical stacker 102 may be pressed upwards by a mechanism that is not shown in the drawings and taken from an upper end opening 103 of the cylindrical stacker 102.

Alternative Example of a Preform Carrier

As shown in FIGS. 5 and 6, the preform carriers 40 each include a horizontal arm 41 whose inner end is linked to the drive chain 53 (the driving member) that is disposed along the carrier circuit 30 and a mandrel 42 that is mounted on an end part (outer end) of the horizontal arm 41. The end part of the horizontal arm 41 is mounted so as to be free to slide on a guide plate 44 that is attached to the apparatus mount 11 so that the horizontal arm 41 becomes parallel with the drive chain 53.

While a preform 6 that is carried by a preform carrier 40 is being conveyed along the semicircular conveying path section 34 of the carrier circuit 30, the preform 6 is transferred by the starwheel 83 of the transfer station 80 to the circular looped path 71 of the blow molding station 70. Accordingly, if the preforms 6 that are carried by the preform carriers 40 are conveyed along the semicircular conveying path section 34 in an unsteady manner, it may not be possible to reliably perform the operation that transfers the preforms 6 from the preform carriers 40 to the starwheel 83. To stop such problems occurring, it is preferable to convey the preform carriers 40 along the semicircular conveying path section 34 in a state where the preform carriers 40 is in tight contact with one another.

Figure 15:
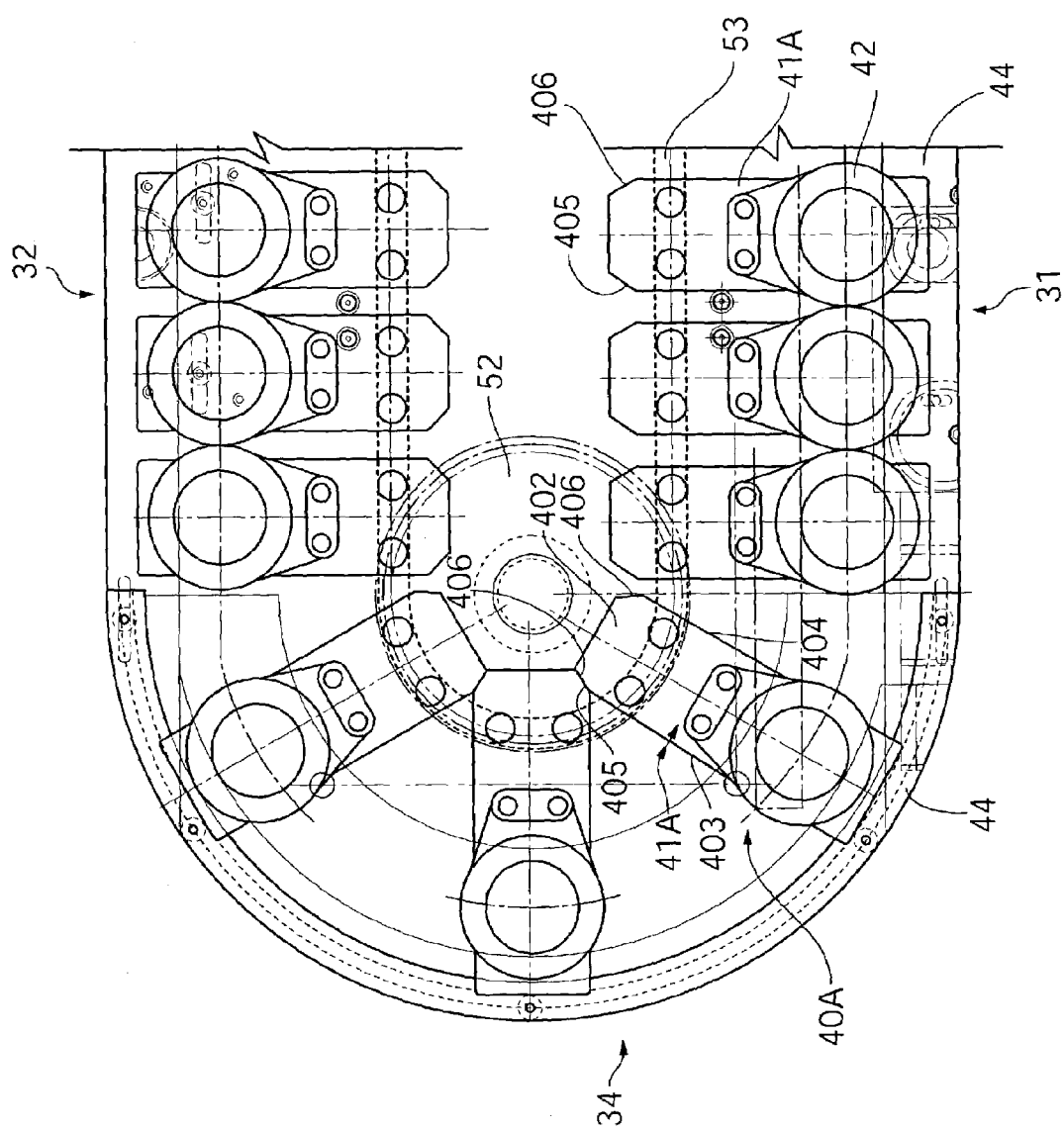
FIG. 15 is an explanatory view showing an alternative construction of a preform carrier according to the present invention.

FIG. 15 shows an example of a preform carrier that uses this kind of construction. In FIG. 15, the parts that are the same as in the embodiment described above have been given the same reference numerals, and such parts will not be described. In the preform carrier 40A of this alternative example, the inner end of the horizontal arm 41A in the radial direction is an elongated part 402 that extends further inwards than the drive chain 53. A pair of joint surfaces 405, 406 are formed at an end part of the elongated part 402, which are formed by cutting side surface parts 403, 404 on the left and right sides of the end part of the elongated part 402 at predetermined angles with respect to the conveying direction.

While the preform carriers 40A are being conveyed along the linear conveying path sections 31, 32, the preform carriers 40A are disposed parallel to one another and perpendicular to the conveying direction. Consequently, the joint surfaces 405, 406 of adjacent preform carriers 40A do not come into contact.

When the preform carriers 40A are being conveyed along the semicircular conveying path section 34, the preform carriers 40A become spread out in a pattern that radiates out from the center of the semicircular conveying path section 34. Accordingly, if the formation positions and angles of the joint surfaces 405, 406, or alternatively the radius of the driven sprocket 52 on which the drive chain 53 is suspended, is/are set appropriately, the preform carriers 40A can be conveyed along the semicircular conveying path section 34 with the joint surfaces 405, 406 of adjacent preform carriers 40A in contact with one another.

By bringing the joint surfaces 405, 406 of adjacent preform carriers 40A into tight contact with one another, instability in the preform carriers 40A can be prevented. As a result, the transferring of the preforms 6 from the preform carriers 40A to the starwheel 83 and the transferring of the preforms 6 from a starwheel to the preform carriers can be performed reliably.

There are also cases where the preform carriers 40A shake as they are being conveyed along the linear conveying path sections 31, 32. This is to say, the preform carriers 40A are conveyed with the outer ends of the preform carriers 40A resting on the guide plate 44. Since the outer ends of the preform carriers 40A simply rest on the guide plate 44, it is easy for the preform carrier 40A to shake to the left and right and up and down during conveying. In particular, when the distance from the inner end of the horizontal arm 41 that is linked to the drive chain 53 to the center of the ring-like bearing surface 42a that carries a preform 6 is large, there is the risk of the preform 6 carried on the ring-like bearing surface 42a shaking and becoming misaligned or even falling off the preform carrier.

Figure 16:
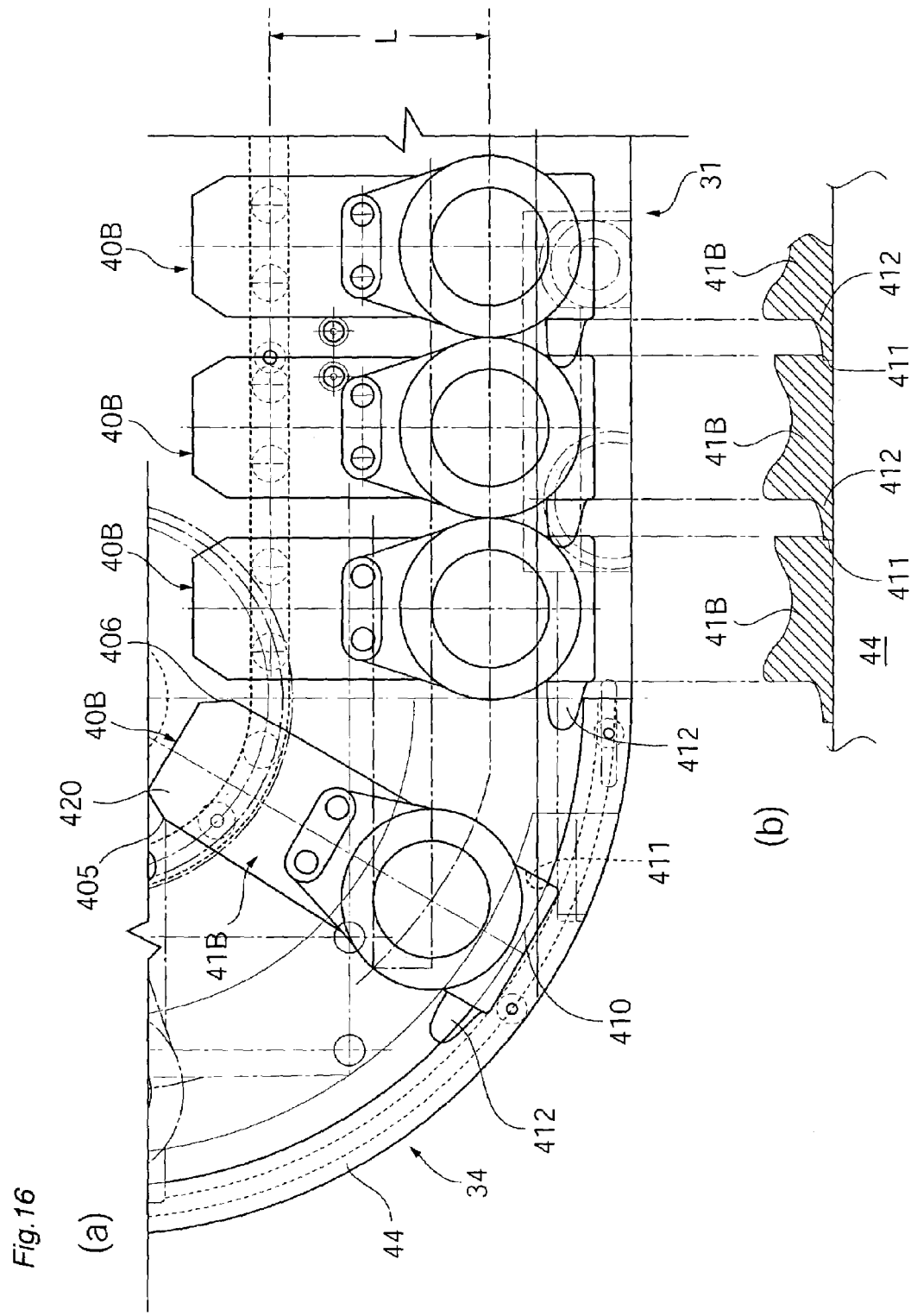
FIGS. 16a and 16b are an explanatory view showing another alternative construction of a preform carrier according to the present invention, and an explanatory view showing the states of the engaged part and the engaging pad.

In order to stop the preform carriers that are conveyed along the linear conveying path sections 31, 32 from shaking, adjacent preform carriers may be linked to one another during conveying, as shown in FIG. 16.

This is to say, an engagement concave part (engaged part) 411 is formed in one of the two side surfaces in the conveying direction of the outer end part 410 of the horizontal arm 41B of the preform carriers 40B shown in FIG. 16, and an engagement protrusion 412 that moves in the conveying direction and can be inserted into an engagement concave part 411 is formed on the other side surface. It should be noted that as with the preform carrier 40A, the joint surfaces 405, 406 are also formed in an inner end part 420 of the preform carrier 40B.

When the preform carriers 40B of the above construction are used, each preform carrier 40B that is conveyed along the linear conveying path section 31 is conveyed with the protrusion 412 of one of a pair of adjacent preform carriers 40B engaging the concave part 411 of the other preform carrier 40B.

As one example, as shown in FIG. 16(b), the concave part 411 may be a groove that is cut out with an appropriate thickness from the lower surface of the horizontal arm 41B, with the protrusion 412 being inserted into a gap between this groove and the guide plate 44. As a result, each preform carrier 40B is linked to the preform carriers 40B in front and behind, thereby preventing shaking in a left-right or an up-down direction.

It should be noted that the engaging part and the engaged part may be a pin and a pin hole or any other type of engaging construction.

Pressing Mechanism for Maintaining Pressure During the Stretch Blow Molding

Figure 17:
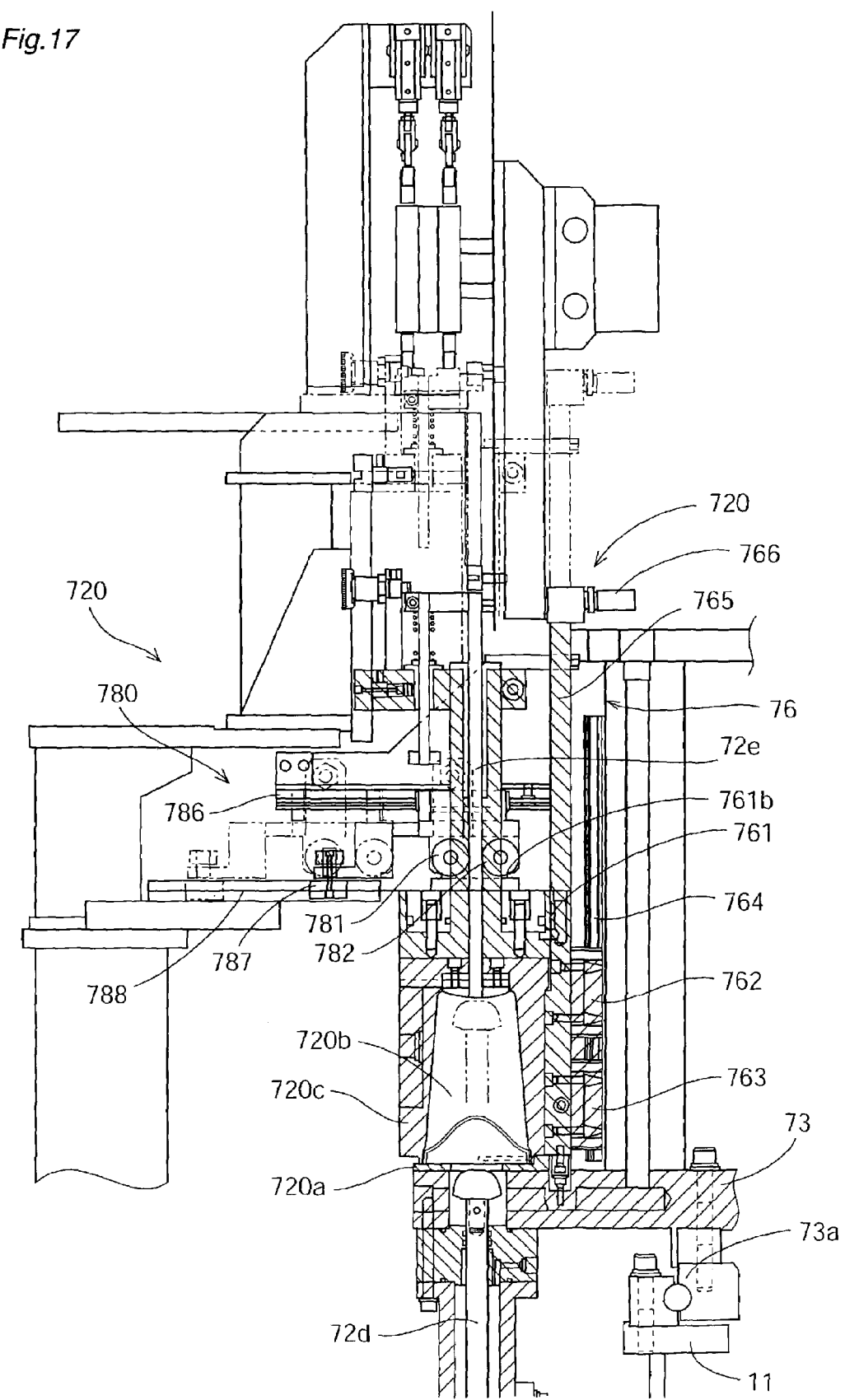
FIG. 17 is a view showing the construction of another example of a stretch blow molding mold assembly.
Figure 18:
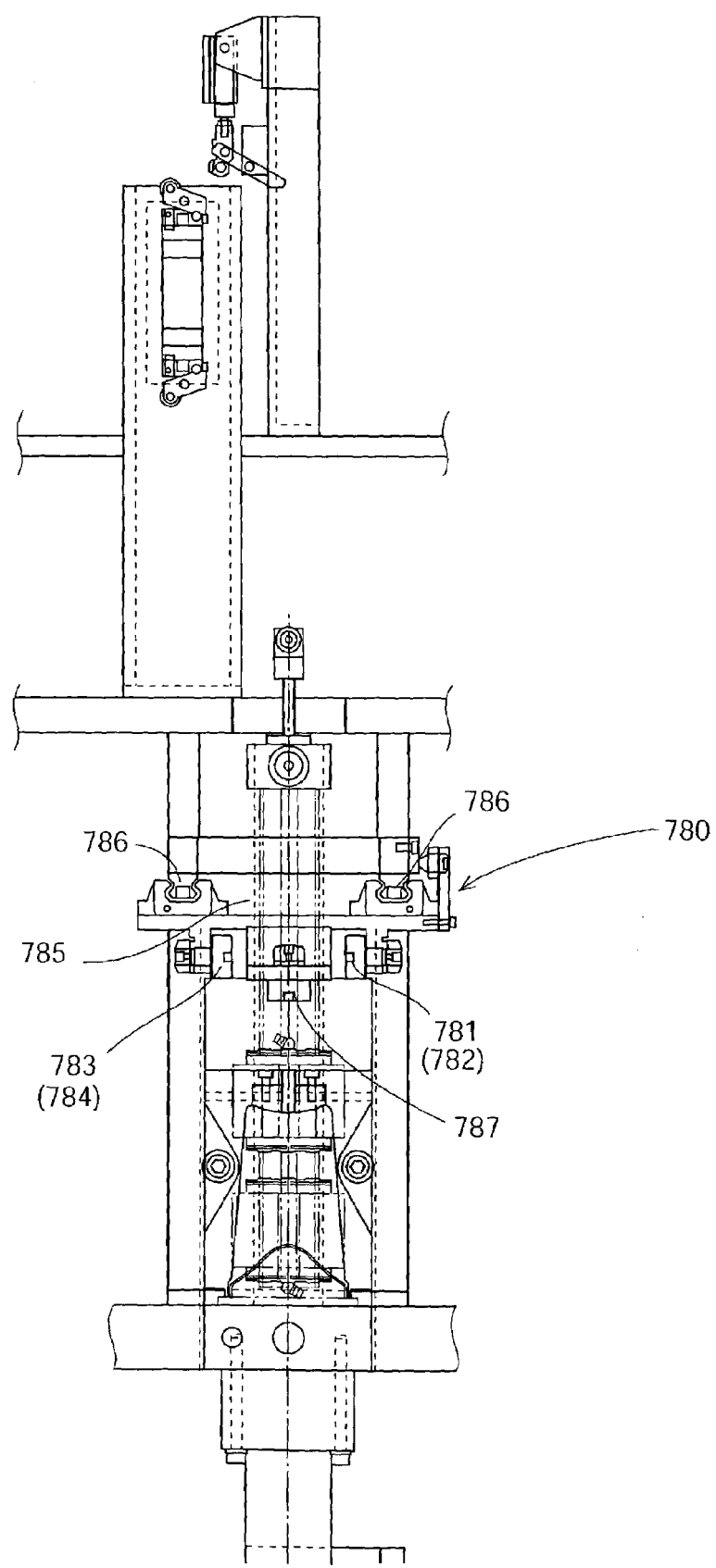
FIG. 18 is a view showing the construction of the stretch blow molding mold assembly shown in FIG. 17 looking from a perpendicular direction.

FIGS. 17 and 18 show an alternative example of a movable shaping mold 72c for use in the stretch blow molding mold assemblies 72 described above. The stretch blow molding mold assemblies 720 include a pressing mechanism in the form of a moving roller for maintaining the clamped state of the mold. It should be noted that parts that correspond to the parts of the stretch blow molding mold assemblies 72 that are described above have been given the same reference numerals.

The fundamental construction of the stretch blow molding mold assemblies 720 of this alternative example is the same as the construction of the stretch blow molding mold assemblies 72, with the stretch blow molding mold assemblies 720 including a baseplate 720a on the fixed side and a shaping mold 720c that can be raised and lowered, with a molding cavity 720b being formed on the inside of the shaping mold 720c. The stretch blow molding mold assemblies 720 are mounted on the rotating disc 73, with the rotating disc 73 being supported so as to be free to rotate by the apparatus mount 11 via a radial thrust bearing 73a that is concentrically attached to the rear surface of the rotating disc 73. The mold opening/closing mechanism 76 for opening and closing the shaping mold 720c includes a support part 761 for supporting the shaping mold 720c, a pair of up/down sliders 762, 763 that are attached to a side surface of the support part 761, and a vertical guide rail 764 along with the sliders 762, 763 can slide up and down. A cam roller 766 is also horizontally attached to the top end of a support pillar 765 that extends vertically upwards from the support part 761. While this cam roller 766 is moving along the circular looped path 71 (see FIG. 8) together with a stretch blow molding mold assembly 720, the cam roller 766 moves along a cam surface (not shown in the drawings) and rises or falls in accordance with the changing height of the cam surface. As a result, an opening and closing operation of the shaping mold 720c is performed with a predetermined timing.

The pressing mechanism 780 for pressing a stretch blow molding mold assembly 720 so that the shaping mold 720c does not rise off the baseplate 720a includes a plurality of pressing rollers that are disposed at sufficiently high positions that enable the rollers to roll on a horizontal upper surface 761a of the support 761 that supports the shaping mold 720c in the clamped state. In this example, a left pair and a right pair of pressing rollers 781 to 784 are provided. A roller support plate 785, which supports these pressing rollers 781 to 784 so that the rollers are free to rotate, is able to move along a horizontal guide rail 786 in a radial direction of the circular carrier circuit of the stretch blow molding mold assembly 720. A cam roller 787 is supported so as to be free to rotate on an outer end of the roller support plate 785 in the radial direction.

The cam roller 787 rolls along a cam surface 788 that is formed on the side of the apparatus mount 11. Due to the cam mechanism composed of the cam roller 787 and the cam surface 788, the pressing rollers 781 to 784 move between a pressing position, which is shown by the solid lines in FIG. 17, where the pressing rollers 781 to 784 press a support 761 of the shaping mold and a released position, which is shown by the imaginary lines, where the pressing rollers 781 to 784 are positioned away to the outside in the radial direction from the upper surface 761a of the support 761.

The roller-type pressing mechanism 780 comes into contact with the support 761 of the shaping mold by rolling, so that the roller-type pressing mechanism 780 can move smoothly between the pressing position and the released position. In particular, even if the roller-type pressing mechanism 780 is applied with an external force to interfere the movement of the mechanism 780 towards its opening position, it can surely be moved towards its opening position, which is benefit.

Alternative Examples of the Preform and the Wide-Mouthed Container

Figure 19:
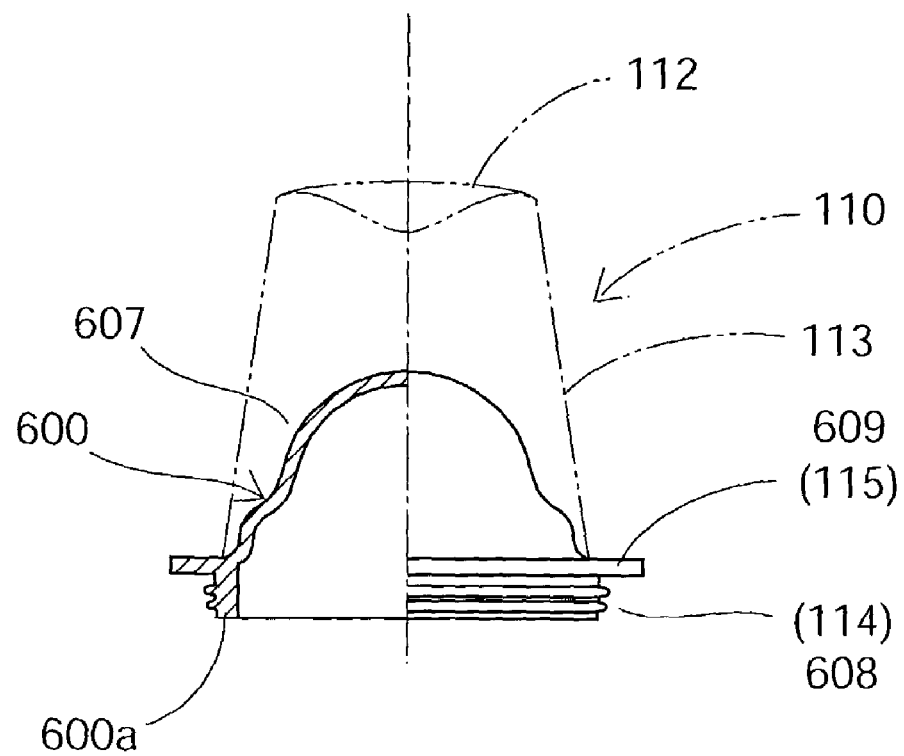
FIG. 19 is an explanatory view showing a wide-mouthed container with a screw part and a preform with a screw part used to mold such a wide-mouthed container.

FIG. 19 shows alternative examples of a preform and a wide-mouthed container that have a screw part formed in the opening. As shown by the imaginary lines in the drawing, a wide-mouthed container 110 provided with a screw part is formed with a cylindrical container main body 113 having a bottom 112, a screw part 114 that is formed in an opening edge part of the container main body 113, and a neck ring 115 (opening flange) in the shape of a ring that is formed between the container main body 113 and the screw part 114. The container main body 113 is formed in the shape of a truncated cone that widens out in the form of a taper from the bottom 112 towards the screw part 114.

A preform 600 that is used to form a wide-mouthed container 100 of this form using a biaxial stretch blow molding method has a shape that includes a stretch molding part 607, which is in the shape of a shallow bowl and forms the container main body 103 when biaxial stretch blow molding is performed, and a screw part 608 and a neck ring 609 that are formed around an opening edge part of the stretch molding part 607, are not stretch molded, and so are left as they are to form the screw part 114 and the neck ring 115 of the wide-mouthed container 110.

Alternative Example of a Stretch Blow Molding Mold Assembly

FIG. 20 shows an alternative example of a preferable stretch blow molding mold assembly for molding wide-mouthed containers 110 with a screw part from the preforms 600 described above. By using this stretch blow molding mold assembly in place of the stretch blow molding mold assemblies 72 and 720 described above, preforms 600 with screw parts can be conveyed on a single plane and subjected to biaxial stretch blow molding in the same way as the preforms 6.

As shown in FIG. 20, the fundamental construction of the stretch blow molding mold assembly 730 is the same as the construction of the stretch blow molding mold assembly 72, so that each stretch blow molding mold assembly 730 includes a baseplate 731 on a fixed side and a shaping mold 732 that can be raised and lowered, with a molding cavity 733 being formed inside the shaping mold 732. A ring-like seating part 734 that projects inwards is formed in an edge of a central opening of the fixed-side baseplate 731, with a rising/falling ring 735 being pressed on this seating part 734 by a spring 736. An opening upper end surface 600a of the preform 600 is placed on a ring-shaped upper end surface 735a of the rising/falling ring 735. When the rising/falling ring 735 is in contact with the seating part 734 (the raised position), the upper end surface 735a is positioned on the same plane as the upper surface of the baseplate 731. This is to say, the upper end surface 735a is positioned with the same height as the conveying level 600A at which the preforms 600 are conveyed.

A ring-shaped part 732a that can press a ring-shaped rear surface of the neck ring 609 of the preform 600 is formed at the lower end part of the shaping mold 732. When the shaping mold 732 is lowered as shown by the arrow, the ring-shaped part 732a at the lower end of the shaping mold 732 presses the preform 600 down. Consequently, the rising/falling ring 735 upon which the preform 600 is placed is pressed downwards against the spring force. As a result, as shown in FIG. 20B, the neck ring 609 of the preform 600 is held between the upper surface of the seating part 734 of the baseplate 731 and the lower surface of the ring-shaped part 732a at the lower end of the shaping mold 732, thereby sealing the inside the cavity 733.

With the mold in a closed state, blow air is introduced into the cavity 733 from the air introducing part 737 and the stretching rod 738 is raised, so that the preform 600 is biaxially stretched and a wide-mouthed container 100 with a screw part can be molded. After the wide-mouthed container 100 has been molded, the shaping mold 732 is raised and the rising/falling ring 735 rises due to the spring force, returning the rising/falling ring 735 to the conveying level 600A. Consequently, the wide-mouthed containers 100 can be taken out of the stretch blow molding mold assemblies 730 via a conveying route that is on a same plane as the preform conveying level 600A and collected.

Alternative Example of the Heating Prevention Means

FIG. 21 shows another example of the heating prevention means for preventing the opening flange 9 of a preform 6 from being heated and shrinking or deforming while the preform 6 is passing the heating station 60. In this drawing, portions corresponding to those of FIG. 6 are denoted by the same reference numerals.

The heating prevention means of this example includes a semicircular-shaped cover plate (frame shaped cover plate) 46A that is lowered onto a preform 6 on a ring-like bearing surface 42a from above and can cover half part of the opening flange 9, and a raising/lowering mechanism 47A for raising and lowering the cover plate 46A. The cover plate 46A is attached horizontally to an upper end of a raising/lowering shaft 46a that is attached to the horizontal arm 41 so as to be able to move up and down.

The raising/lowering mechanism 47A includes a coil spring 47a that continuously presses the raising/lowering shaft 46a down, a cam follower 47b shaped like a roller that is attached to the upper part of the raising/lowering shaft 46a, and raising and lowering cams (not shown) along which the cam follower 47b moves. When the cover plate 46A is raised, the cam follower 47b is raised on the cam surface of the raising cam and the raising/lowering shaft 46a rises against the spring force of the coil spring 47a. On the other hand, when the cover plate 46A is lowered, the raising/lowering shaft 46a is pulled down by the spring force and the cam follower 47b slides across the cam surface of the lowering cam, so that the cover plate 46A is held in the lowered position.

Another Arrangement of the Respective Stations

Figure 22:
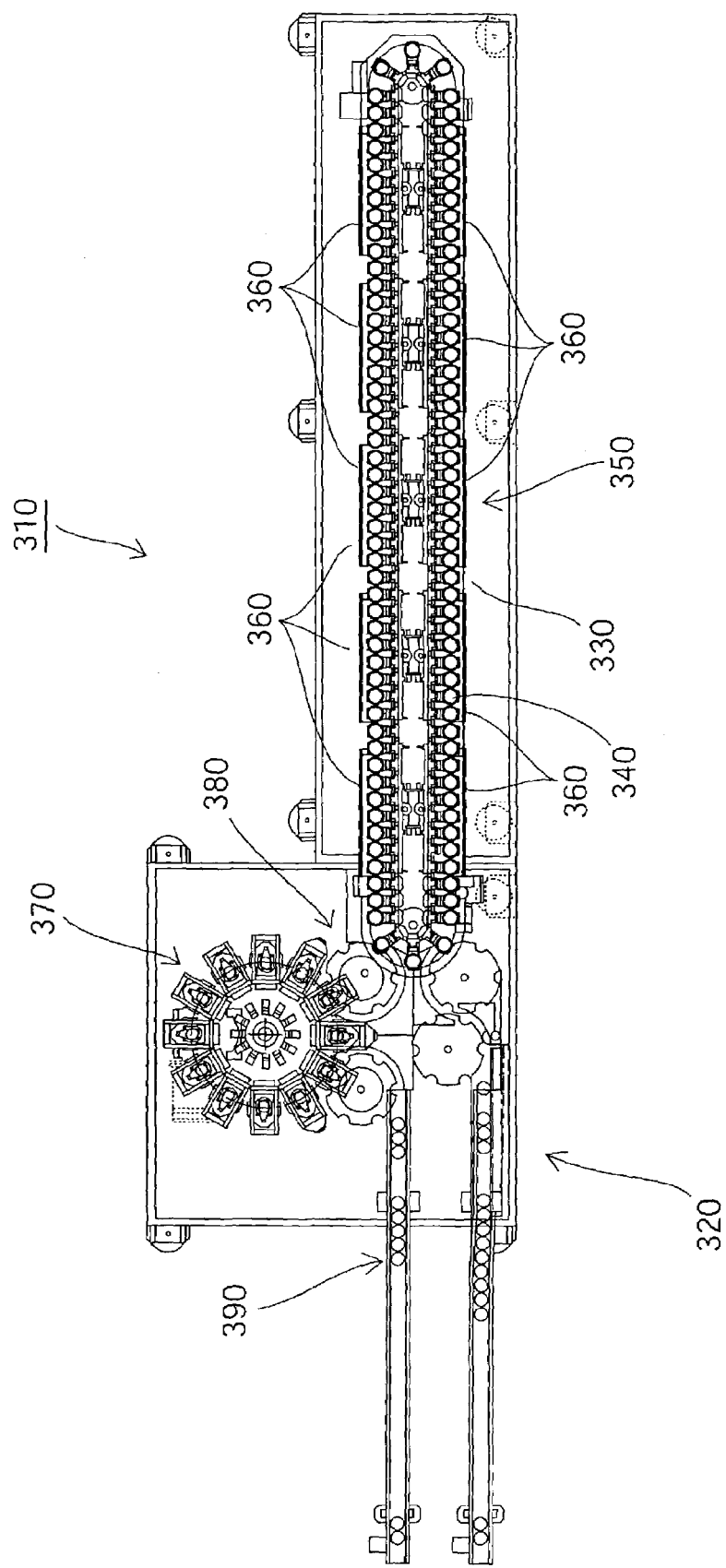
FIG. 22 is a planar view of a biaxial stretch blow molding apparatus according to the present invention, wherein respective stations are arranged in a different manner.
Figure 23:
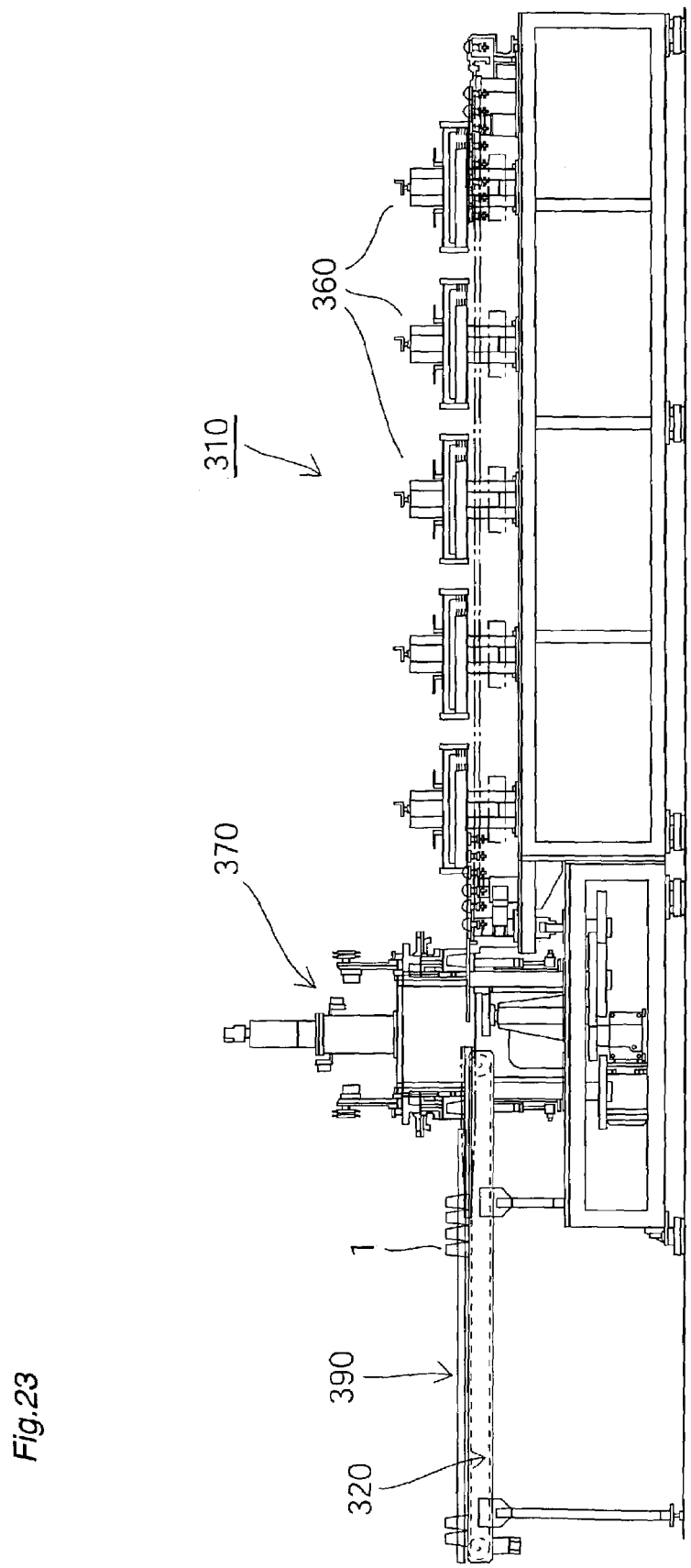
FIG. 23 is an elevational view of the biaxial stretch blow molding apparatus of FIG. 22.
Figure 24:
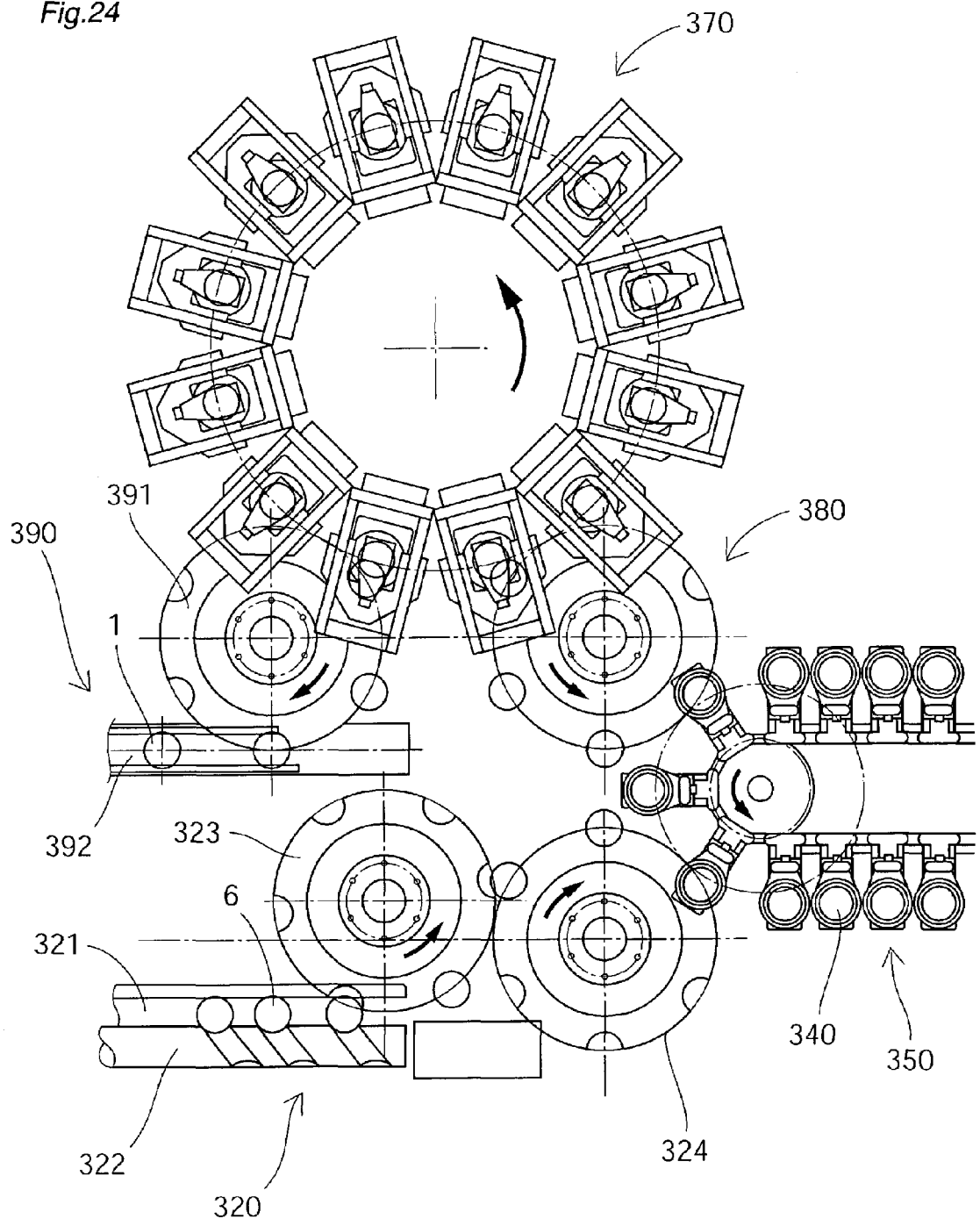
FIG. 24 is an enlarged partial planar view of the biaxial stretch blow molding apparatus of FIG. 22.

FIGS. 22, 23 and 24 show another arrangement of the respective stations of the biaxial stretch blow molding apparatus as shown in FIGS. 2 and 3.

A biaxial stretch blow molding apparatus 310 having the respective stations arranged as shown in FIGS. 22 to 24, heats inverted preforms 6 to a suitable temperature for stretch molding while conveying the preforms 6 on a single plane, continuously conveys the heated preforms 6 in their inverted state on this plane, introduces the preforms 6 into stretch blow molding mold assemblies and performs biaxial stretch blow molding, and then takes the molded wide-mouthed containers from the stretch blow molding mold assemblies and collects the molded wide-mouthed containers.

More specifically, the biaxial stretch blow molding apparatus 310 of this example includes a preform supplying station 320 for supplying the preforms 6, a preform conveying mechanism 350 with a plurality of preform carriers 340 for having the preforms 6 supplied in an inverted state from the preform supplying station 320 go around a loop-shaped carrier circuit 330, and a heating station 360 for heating the preforms 6 that are conveyed by the preform carriers 340 to a suitable temperature for biaxial stretch blow molding. The biaxial stretch blow molding apparatus 310 also includes a blow molding station 370 for subjecting the heated preforms 6 to biaxial stretch blow molding, a transfer station 380 for transferring the heated preforms 6 from the carrier circuit 330 mentioned above to the blow molding station 370, and a collection station 390 for collecting the molded wide-mouthed containers from the blow molding station 370.

As shown in FIG. 24, the preform supplying station 320 of this example has a conveying means such as a conveyer 321 for conveying preforms 6 from an injection molding machine in which the preforms 6 are manufactured, a timing screw 322 for changing a feed pitch of the preforms 6 while being conveyed, and starwheels 323 and 324.

The collection station 390 has a starwheel 391 for collecting the wide-mouthed containers 1 in an inverted state from the blow molding station 370 and a conveying means such as a conveyer 392 for sending the collected wide-mouthed containers 1 in an inverted state out from the apparatus. The wide-mouthed containers 1 are fed to a next station.

It should be noted that the loop-shaped carrier circuit 330, preform carrier 340, preform carrying mechanism 350, heating station 360, transfer station 380 and blow molding station 370 have the same constitutions as those of the biaxial stretch blow molding apparatus 10 of FIGS. 2 and 3, respectively.

Industrial Applicability

As described above, with the present invention, preforms are formed in advance and are reheated and subjected to stretch blowing to manufacture wide-mouthed containers. Consequently, according to the present invention, an efficient manufacturing method and apparatus for wide-mouthed containers that do not waste materials can be realized. Unlike when wide-mouthed containers are formed from films, the material thickness of the container main body can be ensured, so that deep and strong wide-mouthed containers can be manufactured easily.

With the present invention, preform carriers go around a loop-shaped carrier circuit and stretch blow molding mold assemblies go around a loop-shaped shaping mold carrier circuit, with the transfer of the preforms between the preform carriers and the stretch blow molding mold assemblies being performed by having the preforms slide on a plane in an inverted state by making use of the opening flanges or opening end surfaces. Consequently, with the present invention, a series of molding processes, including heating and blow molding, can be continuously performed at high speed. As a result, wide-mouthed containers can be efficiently molded.

What is claimed is:

1. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding; and taking out a wide-mouthed container out of the stretch blow molding mold after molding and collecting the wide-mouthed container;

wherein the preform is conveyed along a conveying path on a single plane, the biaxial stretch blow molding apparatus comprising:

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding;

a collection station for collecting molded wide-mouthed containers from the blow molding station, wherein the preforms are conveyed in an inverted state on a single plane by the preform carriers and are transferred to the blow molding station in the inverted state and on the same plane, wherein each preform carrier includes a frame-like bearing surface on which an opening flange or an opening end surface of a preform in the inverted state rests, wherein each preform carrier includes heating prevention means for preventing the opening flange or screw part and opening flange of the preform that rests on the frame-like bearing surface from being heated and shrinking and deforming, wherein each heating prevention means includes: a cover plate, which is lowered from above the preform on the frame-like bearing surface and is capable of covering at least a part of the opening flange; and a raising/lowering mechanism for raising and lowering the cover plate.

2. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding; and taking out a wide-mouthed container out of the stretch blow molding mold after molding and collecting the wide-mouthed container;

wherein the preform is conveyed along a conveying path on a single plane, the biaxial melt blow molding apparatus comprising;

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding;

a collection station for collecting molded wide-mouthed containers from the blow molding station, wherein the preforms are conveyed in an inverted state on a single plane by the preform carriers and are transferred to the blow molding station in the inverted state and on the same plane, wherein each preform carrier includes a frame-like bearing surface on which an opening flange or an opening end surface of a preform in the inverted state rests, wherein each preform carrier includes position correcting means for correcting a position of the preform that rests on the frame-like bearing surface, and wherein each position correcting means includes a core that can be inserted inside the opening flange of the preform via a central opening of the frame-like bearing surface from below the frame-like bearing surface, and a raising/lowering mechanism for raising and lowering the core.

3. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding;

taking out a wide-mouthed container out of the stretch blow molding mold after molding and collecting the wide-mouthed container;

wherein the preform is conveyed along a conveying path on a single plane, the biaxial melt blow molding apparatus comprising;

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding;

a collection station for collecting molded wide-mouthed containers from the blow molding station, wherein the preforms are conveyed in an inverted state on a single plane by the preform carriers and are transferred to the blow molding station in the inverted state and on the same plane, wherein the blow molding station includes a circular circuit and a plurality of stretch blow molding mold assemblies that go around the circular circuit at a predetermined pitch, each of the stretch blow molding mold assemblies includes a first mold and a second mold that are opened and closed relative to one another in a vertical direction, when the first mold and the second mold are in a closed state, the opening flange of the preform is held between the first mold and the second mold is a sealed state, and wherein the first mold is a fixed-side baseplate and the second mold is a shaping mold that moves up and down.

4. A biaxial stretch blow molding apparatus for wide-mouthed containers according to claim 3,
wherein the baseplate includes: a rising/falling ring that has an upper surface on which an opening end surface of a preform having a screw part for molding a wide-mouthed container having a screw part can be placed; and a spring member for holding the upper surface of the rising/falling ring at a position at a same height as an upper surface of the baseplate, and
when the shaping mold has been lowered to form a mold clamping state, the rising/falling ring is pressed downwards by the shaping mold and the opening flange of the preform is held between the shaping mold and the baseplate in a sealed state.

5. A biaxial stretch blow molding apparatus for wide-mouthed containers according to claim 3,
further comprising clamping force increasing means for applying air pressure that is equal to the blow air to a rear surface of the shaping mold during clamping.

6. A biaxial stretch blow molding apparatus for wide-mouthed containers according to claim 3,
further comprising a pressing mechanism for maintaining a clamped state of the shaping mold,
wherein the pressing mechanism includes a pressing roller that is in rolling contact with the shaping mold and presses down the shaping mold in the clamped state.

7. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:
providing a preform including a stretch molding part that is made into the container main body by biaxial stretch blow molding and an opening flange that is formed along an opening part of the stretch molding part, is not stretch molded, and remains as the opening flange of the wide-mouthed container;
heating the preform to a temperature suited to stretch molding while the preform is conveyed in an inverted state;
inserting the heated preform in the inverted state into a stretch blow molding mold and performing biaxial stretch blow molding; and
taking out a wide-mouthed container out of the stretch blow molding mold after molding and collecting the wide-mouthed container;
wherein the preform is conveyed along a conveying path on a single plane,
the biaxial stretch blow molding apparatus comprising:
a preform supplying station for supplying preforms;
a plurality of preform carriers for sending the preforms that have been supplied from the preform supplying station around a loop-shaped carrier circuit that is positioned on a single plane;
a heating station, which is arranged at a position along the carrier circuit, for heating the preforms that are conveyed by the preform carriers to a temperature suited to biaxial stretch blow molding;
a blow molding station for receiving the heated preforms from the perform carriers and performing biaxial stretch blow molding; and
a collection station for collecting molded wide-mouthed containers from the blow molding station,
wherein the preforms are conveyed in an inverted state on a single plane by the preform carriers and are transferred to the blow molding station in the inverted state and on the same plane;
wherein the carrier circuit includes a linear conveying path section that extends past the heating station and a semicircular conveying path section that is connected to the linear conveying path section;
the blow molding station includes a circular circuit and a plurality of stretch blow molding mold assemblies that go around the circular circuit at a predetermined pitch, and
a radius of a movement path taken by preforms that are conveyed around the semicircular conveying path section is adjusted so that a feed pitch of the preforms transported around the semicircular conveying path section is matched to a feed pitch of the stretch blow molding mold assemblies transported around the circular circuit.

8. A biaxial stretch blow molding apparatus for wide-mouthed containers according to claim 7,
further comprising transfer means for transferring a preform that is carried by a preform carrier that has reached a preform transfer position of the semicircular conveying path section to a stretch blow molding mold assembly that has reached a preform receiving position of the circuit,
wherein the transfer means includes a slide surface on which an end surface or an opening end surface of the opening flange of a preform slides, an arc-shaped guide that is formed on the slide surface, a rotating disc for sending a preform positioned at the preform transfer position along the arc-shaped guide to a preform receiving position, and semicircular grooves that are formed in an outer circumferential surface at intervals of a predetermined angle, and
a preform slides along the slide surface with the preform being held between a semicircular groove and the arc-shaped guide.

9. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:
providing a preform including a stretch molding part that is made into the container main body by biaxial stretch blow molding and an opening flange that is formed along an opening part of the stretch molding part, is not stretch molded, and remains as the opening flange of the wide-mouthed container;
heating the preform to a temperature suited to stretch molding while the preform is conveyed in an inverted state;
inserting the heated preform in the inverted state into a stretch blow molding mold and performing biaxial stretch blow molding; and
taking out a wide-mouthed container out of the stretch blow molding mold after molding and collecting the wide-mouthed container;
wherein the preform is conveyed along a conveying path on a single plane,
the biaxial stretch blow molding apparatus comprising:
a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding; and a collection station for collecting molded wide-mouthed containers from the blow molding station, wherein the preforms are conveyed in an inverted state on a single plane by the preform carriers and are transferred to the blow molding station in the inverted state and on the same plane, and wherein the preform supplying station includes a cylindrical preform supplying cylinder that stores a plurality of preforms, whose posture is inverted, stacked on top of one another, a dropping mechanism for having one preform drop at a time from a lower end opening of the preform supplying cylinder using a plurality of screws, and a starwheel in which a plurality of semicircular pockets, into which the opening flanges or opening end parts of the preforms fit, are concentrically formed, the starwheel receiving a dropped preform in a semicircular pocket that is positioned directly below the lower end opening.

10. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding;

taking out a wide-mouthed container out of the stretch blow molding mold after molding and collecting the wide-mouthed container;

wherein the preform is conveyed along a conveying path on a single plane, the biaxial stretch blow molding apparatus comprising:

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding; and a collection station for collecting molded wide-mouthed containers from the blow molding station, wherein the preforms are conveyed in an inverted state on a single plane by the preform carriers and are transferred to the blow molding station in the inverted state and on the same plane, and wherein the collection station includes an air nozzle for blowing upwards a wide-mouthed container that has been collected in an inverted state from the blow molding station, a cylindrical stacker extends in a vertical direction and receives the wide-mouthed container that has been blown upwards, and a winding up belt mechanism for sending upwards the wide-mouthed container, which has been blown upwards, from a lower end opening of the cylindrical stacker.

11. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding;

taking out a wide-mouthed container out of the stretch blow molding mold after molding and collecting the wide-mouthed container;

wherein the preform is conveyed along a conveying path on a single plane, the biaxial stretch blow molding apparatus comprising:

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the Preform carriers to a temperature suited to biaxial stretch blow molding;

a blow molding station for receiving the heated preforms from the perform carriers and performing biaxial stretch blow molding;

a collection station for collecting molded wide-mouthed containers from the blow molding station, wherein the preforms are conveyed in an inverted state on a single plane by the preform carriers and are transferred to the blow molding station in the inverted state and on the same plane, wherein each preform carrier includes a frame-like bearing surface on which an opening flange or an opening end surface of a preform in the inverted state rests, wherein the carrier circuit includes a linear conveying path section that extends past the heating station and a semicircular conveying path section that is connected to the linear conveying path section, each preform carrier includes a horizontal arm linked to an internal end part of the driving member, a mandrel that is mounted on an external end part of the horizontal arm, and a frame-like carrier surface that is formed on an upper surface of the mandrel, where the horizontal arm of each preform carrier has joint surfaces that are formed on each side surface in a conveying direction of the horizontal arm, and the joint surfaces of adjacent preform carriers come into tight contact with one another while the preform carriers are being conveyed around the semicircular conveying path section.

12. A biaxial stretch blow molding apparatus for wide-mouthed containers according to claim 11, wherein the internal end part of the horizontal arm of each preform carrier includes an extended part that extends beyond the driving member, and the joint surfaces are formed on both side surfaces of the extended part as surfaces that are slanted by a predetermined angle relative to a direction which is perpendicular to a preform conveying direction.

13. A biaxial stretch blow molding apparatus for wide-mouthed containers which molds wide-mouthed containers using a biaxial stretch blow molding method for a wide-mouthed container that molds the wide-mouthed container, which has a shape including an opening flange that extends outwards at an opening part of a cylindrical container main body having a bottom, using biaxial stretch blow molding, comprising steps of:

providing a preform including a stretch molding part that is made into the container main body by biaxial stretch blow molding and an opening flange that is formed along an opening part of the stretch molding part, is not stretch molded, and remains as the opening flange of the wide-mouthed container;

heating the preform to a temperature suited to stretch molding while the preform is conveyed in an inverted state;

inserting the heated preform in the inverted state into a stretch blow molding mold and performing biaxial stretch blow molding; and taking out a wide-mouthed container out of the stretch blow molding mold after molding and collecting the wide-mouthed container;

wherein the preform is conveyed along a conveying path on a single plane, the biaxial stretch blow molding apparatus comprising:

a preform supplying station for supplying preforms;

a plurality of preform carriers for sending the preforms that have been supplied from the preform supplying station around a loop-shaped carrier circuit that is positioned on a single plane;

a heating station, which is arranged at a position along the carrier circuit, for heating the preforms that are conveyed by the preform carriers to a temperature suited to biaxial stretch blow molding;

a blow molding station for receiving the heated preforms from the perform carriers and performing biaxial stretch blow molding; and a collection station for collecting molded wide-mouthed containers from the blow molding station, wherein the preforms are conveyed in an inverted state on a single plane by the preform carriers and are transferred to the blow molding station in the inverted state and on the same plane, wherein each preform carrier includes a frame-like bearing surface on which an opening flange or an opening end surface of a preform in the inverted state rests, wherein the carrier circuit includes a linear conveying path section that extends past the heating station and a semicircular conveying path section that is connected to the linear conveying path section, each preform carrier includes a horizontal arm linked to an internal end part of the driving member, a mandrel that is mounted on an external end part of the horizontal arm, and a frame-like carrier surface that is formed on an upper surface of the mandrel, wherein the horizontal arm of each preform carrier includes an engaged part that is formed on one of two side surfaces in a preform conveying direction, and an engaging part that is formed on another side surface and can engage the engaged part in the preform conveying direction, and while each preform carrier is being conveyed on the linear conveying path section, the engaged part of the horizontal arm of each preform carrier is engaged by the engaging part of an adjacent preform carrier.

14. A biaxial stretch blow molding apparatus for wide-mouthed containers according to claim 13, wherein the engaged part and the engaging part are formed in side surfaces of an outer end part of each horizontal arm.

* * * * *